United States Patent
Inoue et al.

(10) Patent No.: US 8,498,958 B2
(45) Date of Patent: Jul. 30, 2013

(54) MOVING OBSTACLE DECIDING APPARATUS AND METHOD

(75) Inventors: Satoru Inoue, Tokyo (JP); Yukio Nishimoto, Tokyo (JP); Kazutada Yamauchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 603 days.

(21) Appl. No.: 12/741,005

(22) PCT Filed: Nov. 11, 2008

(86) PCT No.: PCT/JP2008/003257
§ 371 (c)(1),
(2), (4) Date: Apr. 30, 2010

(87) PCT Pub. No.: WO2009/090696
PCT Pub. Date: Jul. 23, 2009

(65) Prior Publication Data
US 2010/0268683 A1    Oct. 21, 2010

(30) Foreign Application Priority Data
Jan. 16, 2008   (JP) .................................. 2008-006873

(51) Int. Cl.
*G06F 17/00* (2006.01)
*G06N 7/04* (2006.01)

(52) U.S. Cl.
USPC .......................................................... 706/54

(58) Field of Classification Search
None
See application file for complete search history.

(56) References Cited

U.S. PATENT DOCUMENTS

| 5,325,096 | A | * | 6/1994 | Pakett ............................. 342/70 |
| 2005/0195383 | A1 | * | 9/2005 | Breed et al. .................. 356/4.01 |
| 2006/0195199 | A1 | | 8/2006 | Iwasaki et al. |

FOREIGN PATENT DOCUMENTS

| JP | 63-131084 A | 6/1988 |
| JP | 64-43785 A | 2/1989 |
| JP | 3-289579 A | 12/1991 |
| JP | 4-50059 A | 2/1992 |
| JP | 8-27342 B | 3/1996 |
| JP | 09-257930 | 10/1997 |
| JP | 10-100795 A | 4/1998 |
| JP | 11-352228 A | 12/1999 |
| JP | 2001-235543 A | 8/2001 |
| JP | 2006-125891 | 5/2006 |
| JP | 2007-28680 A | 2/2007 |

OTHER PUBLICATIONS

'A neural mechanism for detecting the distance of a selected target by modulating the FM sweep rate of biosonar in echolocation of bat': Kamata, 2004, Science Direct, biosystems 76 (2004) pp. 55-64.*

* cited by examiner

*Primary Examiner* — Kakali Chaki
*Assistant Examiner* — Peter Coughlan
(74) *Attorney, Agent, or Firm* — Birch, Stewart, Kolasch & Birch, LLP

(57) ABSTRACT

A moving obstacle deciding apparatus includes a search signal transmitting and receiving section 1 for transmitting a search signal, and for receiving the search signal reflected from a search target as a detection signal; a decision reference value calculating section 6 for calculating a decision reference value based on the detection signal received by the search signal transmitting and receiving section 1; and a moving obstacle deciding section 10 for making a decision as to whether the search target is a moving obstacle or not in accordance with a compared result of a difference value between decision reference values obtained by the decision reference value calculating section 6 in time-series searches with a prescribed threshold.

16 Claims, 14 Drawing Sheets

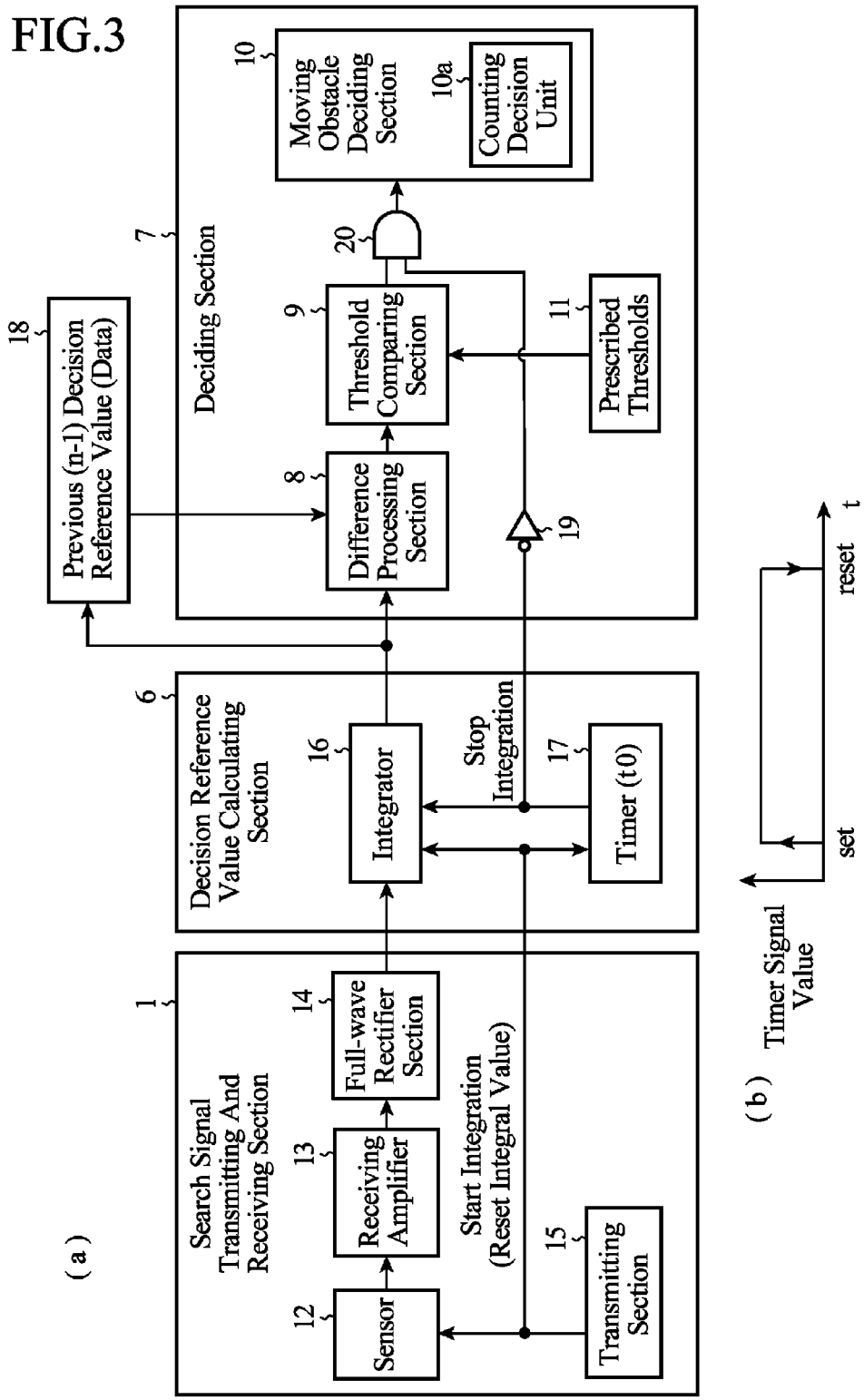

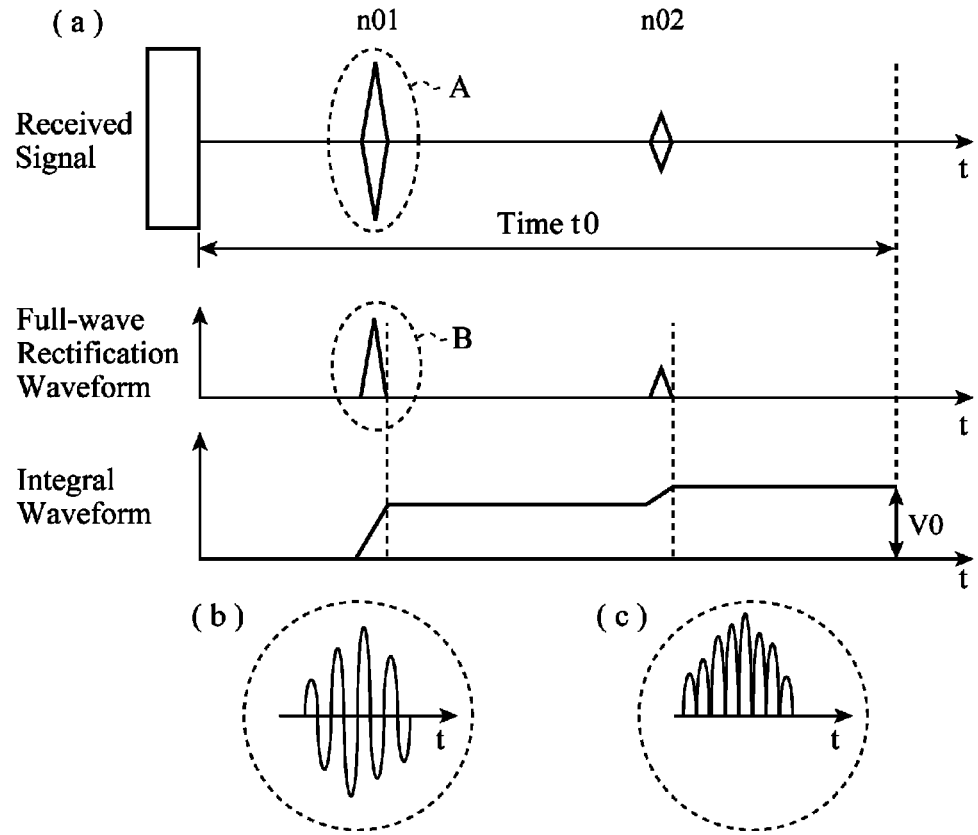
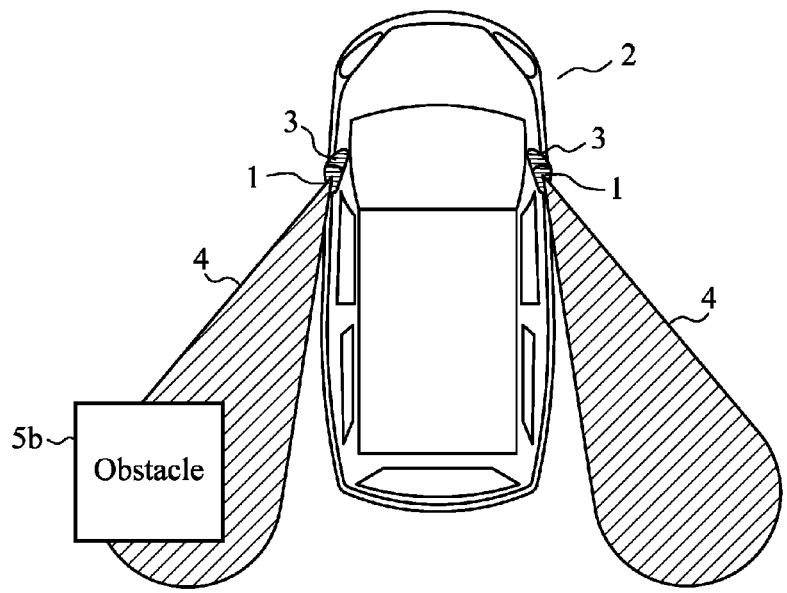

| Area | | ① | ② | ③ | ④ | ⑤ | ⑥ | ⑦ |
|---|---|---|---|---|---|---|---|---|
| Area Detection Result | Previous | | V01 | | | V02 | | |
| | Current | V11 | V01 | | | V02 | | |
| Threshold Decision Result | | ● | — | — | — | — | — | — |

(b)

| Area | | ① | ② | ③ | ④ | ⑤ | ⑥ | ⑦ |
|---|---|---|---|---|---|---|---|---|
| Area Detection Result | Previous | V11 | V01 | | | V02 | | |
| | Current | | V01 | V21 | | V02 | | |
| Output Change Result | | ● | — | ● | — | — | — | — |

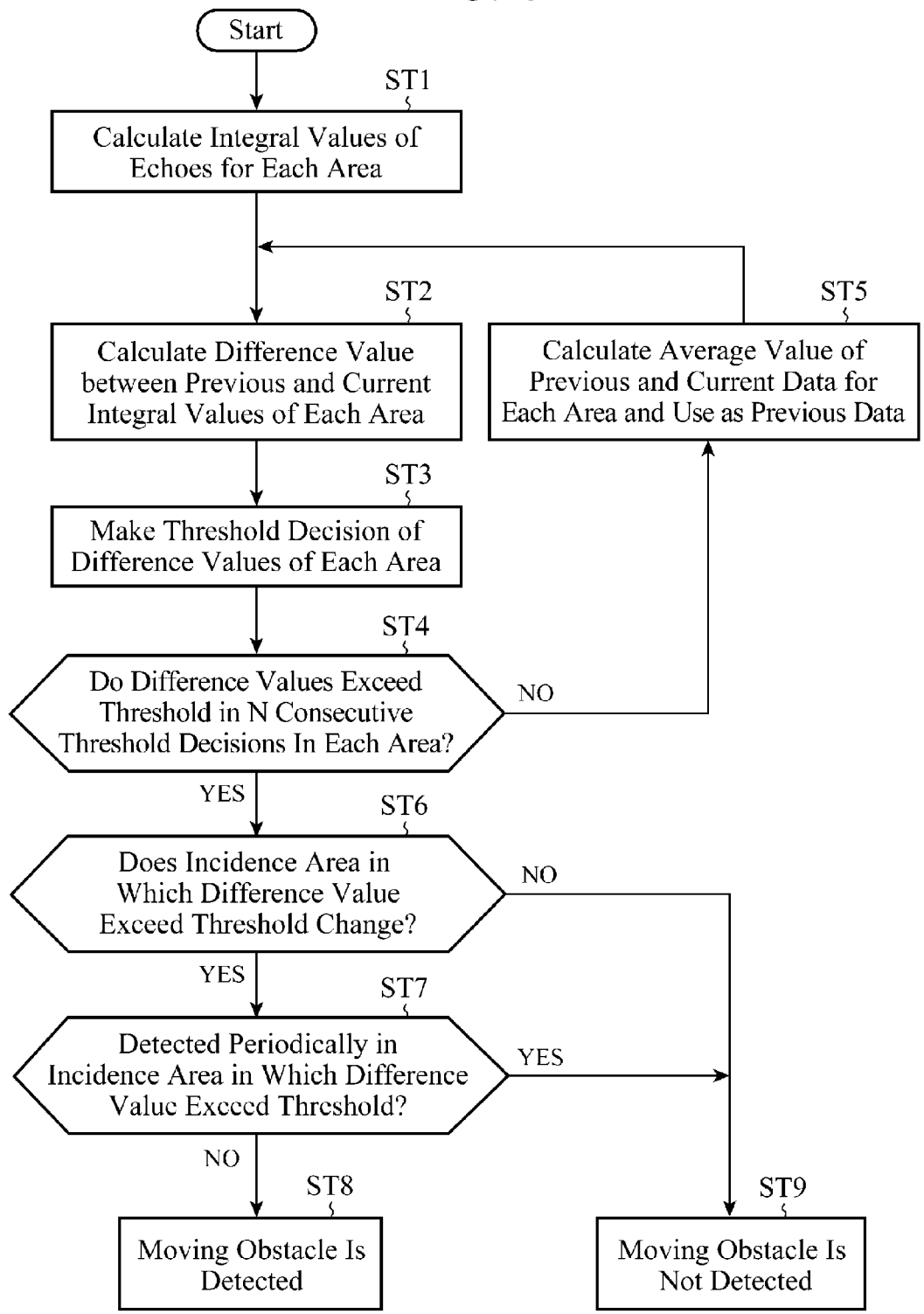

MOVING OBSTACLE DECIDING APPARATUS AND METHOD

TECHNICAL FIELD

The present invention relates to a moving obstacle deciding apparatus for making a decision as to whether a search target is a moving obstacle or not.

BACKGROUND ART

As a conventional system for detecting an obstacle with a sensor mounted on a vehicle, a system disclosed in Patent Document 1 is known, for example. The system detects the vehicle behind and the like in a blind spot of door mirrors with ultrasonic sensors mounted on the door mirrors while driving, and operates as a vehicle monitoring (antitheft) system by monitoring an object near the sides of the vehicle while the vehicle is stopped.

On the other hand, an obstacle detecting apparatus of an automated guided vehicle described in Patent Document 2 time-shares a detection area of a ultrasonic sensor in a forward space of the automated guided vehicle, and makes a decision as to whether detection signals include noise or not from the number of areas from which the detection signals are obtained. Since acoustic noise has a high sound pressure level, it is received by the ultrasonic sensor as signals from a lot of detection areas. Accordingly, deciding the signals which are received from a lot of detection areas as noise makes it possible to prevent misdetection due to the acoustic noise.

Patent Document 1: Japanese Patent Laid-Open No. 10-100795/1998
Patent Document 2: Japanese Patent Publication No. 8-27342/1996

The conventional system decides that when the detection signals are present in one to two areas among the time-shared areas, they are normal, and that when the detection signals are present in three or more areas, they are noise.

However, it does not consider the continuity of the detection signal occurring in each detection area (the continuity of the detection signal in each search processing), which presents a problem of being unable to decide accurately as to whether the detected obstacle is a moving obstacle or not.

In addition, the conventional system is likely to make an erroneous decision that a static obstacle is a moving obstacle when the ultrasonic echo signals vary periodically as in the case of branches and leaves of a tree swayed in the wind. Thus, the conventional system has a problem of being unable to distinguish a moving obstacle such as a person from a static obstacle such as a tree accurately.

The present invention is implemented to solve the foregoing problems. Therefore it is an object of the present invention to provide a moving obstacle deciding apparatus capable of making a decision as to whether the search target is a moving obstacle or not accurately.

DISCLOSURE OF THE INVENTION

A moving obstacle deciding apparatus in accordance with an aspect of the present invention includes: a search signal transmitting and receiving section for transmitting a search signal, and for receiving the search signal reflected from a search target as a detection signal; a decision reference value calculating section for dividing a range of a transmission period of the search signal into a prescribed number of divisions, for calculating a decision reference value based on an integral value of the detection signal occurring in each of the divisions, and for dividing a detection area, which is a range of the search signal transmitted from the search signal transmitting and receiving section, into a plurality of divisional areas in accordance with distance from the search signal transmitting and receiving section or in accordance with time up to reception of the detection signal; and a deciding section for making a decision as to whether the search target is a moving obstacle or not in accordance with a compared result of a difference value between the decision reference values obtained in time-series searches by the decision reference value calculating section with a prescribed threshold for each of the divisional areas, wherein the thresholds of the divisional areas are set in a manner as to become smaller as separated farther away from the search signal transmitting and receiving section.

A moving obstacle deciding method in accordance with a further aspect of the present invention includes: transmitting, by utilizing a search signal transmitting and receiving section, a search signal, and receiving, by utilizing the search signal transmitting and receiving section, the search signal reflected from a search target as a detection signal; a decision reference value calculating step for dividing a range of a transmission period of the search signal into a prescribed number of divisions, for calculating a decision reference value based on an integral value of the detection signal occurring in each of the divisions, and for dividing a detection area, which is a range of the search signal transmitted from the search signal transmitting and receiving section, into a plurality of divisional areas in accordance with distance from the search signal transmitting and receiving section or in accordance with time up to reception of the detection signal; and making a decision as to whether the search target is a moving obstacle or not in accordance with a compared result of a difference value between the decision reference values obtained in time-series searches by the decision reference value calculating step with a prescribed threshold for each of the divisional areas, wherein the thresholds of the divisional areas are set in a manner as to become smaller as separated farther away from the search signal transmitting and receiving section.

A moving obstacle deciding apparatus in accordance with a further aspect of the present invention includes: a search signal transmitting and receiving section for transmitting a search signal, and for receiving the search signal reflected from a search target as a detection signal; a decision reference value calculating section for dividing a range of a transmission period of the search signal into a prescribed number of divisions, and for calculating a decision reference value based on an integral value of the detection signal occurring in each of the divisions; a deciding section for making a decision as to whether the search target is a moving obstacle or not in accordance with a compared result of a difference value between the decision reference values obtained in time-series searches by the decision reference value calculating section with a prescribed threshold; and an averaging processing section for calculating an average value or moving average value of the integral values of the detection signals obtained in a prescribed number of time-series searches up to a previous search, wherein the decision reference value calculating section obtains a difference value between the average value or moving average value calculated by the averaging processing section and the integral value of the detection signal obtained by a current search, and makes a decision as to whether the search target is a moving obstacle in accordance with a compared result between the difference value and the prescribed threshold.

A moving obstacle deciding method in accordance with a further aspect of the present invention includes: transmitting, by utilizing a search signal transmitting and receiving section, a search signal, and receiving, by utilizing the search signal transmitting and receiving section, the search signal reflected from a search target as a detection signal; a decision reference value calculating step for dividing a range of a transmission period of the search signal into a prescribed number of divisions, and for calculating a decision reference value based on an integral value of the detection signal occurring in each of the divisions; a deciding step for making a decision as to whether the search target is a moving obstacle or not in accordance with a compared result of a difference value between the decision reference values obtained in time-series searches by the decision reference value calculating step with a prescribed threshold; and calculating an average value or moving average value of the integral values of the detection signals obtained in a prescribed number of time-series searches up to a previous search, wherein the decision reference value calculating step obtains a difference value between the average value or the calculated moving average value and the integral value of the detection signal obtained by a current search, and makes a decision as to whether the search target is a moving obstacle in accordance with a compared result between the difference value and the prescribed threshold.

According to the present invention, since it receives the search signal reflected from the search target as the detection signal, and makes a decision as to whether the search target is a moving obstacle or not from the results of comparing the difference values between the decision reference values calculated from the detection signals received in the time-series searches with the prescribed threshold, it can decide as to whether the search target is a moving obstacle or not correctly. In addition, using the integral values of the detection signals in the prescribed divisions as the decision reference values makes it possible to obtain decision reference values including variations in time-series detection signals, which offers an advantage of being able to grasp the variations in the time-series detection signals accurately.

BRIEF DESCRIPTION OF THE DRAWINGS

FIG. 3 is a block diagram showing a detailed configuration of the moving obstacle deciding apparatus of the embodiment 1;

FIG. 4 is a diagram showing an example of received signals obtained by vehicle monitoring by the moving obstacle deciding apparatus in FIG. 2;

FIG. 5 is a diagram illustrating a condition in which the received signals in FIG. 4 are obtained;

FIG. 17 is a diagram showing threshold decision results by the embodiment 3;

FIG. 19 is a flowchart showing the operation of the moving obstacle deciding apparatus in FIG. 18.

BEST MODE FOR CARRYING OUT THE INVENTION

The best mode for carrying out the invention will now be described with reference to the accompanying drawings to explain the present invention in more detail.

Embodiment 1

Figure 1:
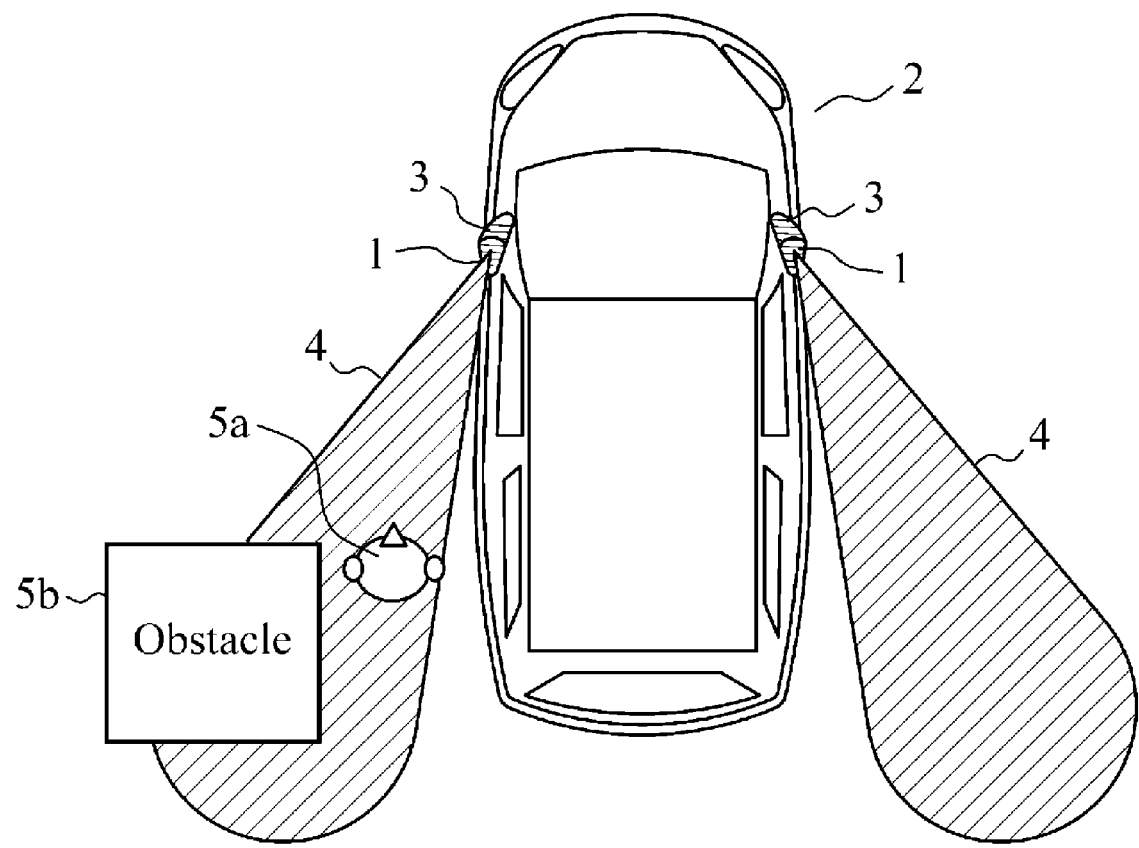
FIG. 1 is a diagram showing a sensor system for a vehicle to which a moving obstacle deciding apparatus in accordance with the present invention is applied.

FIG. 1 is a diagram showing a sensor system for a vehicle to which a moving obstacle deciding apparatus in accordance with the present invention is applied, which shows a vehicle monitoring system for detecting a moving obstacle approaching a vehicle when it is stopped. The system shown in FIG. 1 forms at rear lateral sides of a vehicle 2 detection areas 4 of search signal transmitting and receiving sections 1 mounted on door mirrors 3 with the door mirrors 3 being folded and retracted while the vehicle is stopped. The search signal transmitting and receiving sections 1 make the ranges of the transmitted search signals the detection areas 4, and detect the obstacle by receiving reflected signals from a moving obstacle 5a such as a person or a static obstacle 5b such as a tree in the detection areas 4.

The vehicle monitoring system is expected to accurately detect the moving obstacle 5a like a suspicious person approaching the vehicle 2 among the obstacles detected by the search signal transmitting and receiving sections 1 when the vehicle 2 is stopped. However, the conventional system sometimes erroneously detects the static obstacle 5b showing a periodic movement such as branches and leaves swayed in the wind as a moving obstacle. In contrast, when deciding the moving obstacle from the obstacles detected by the search signal transmitting and receiving sections 1, the moving obstacle deciding apparatus in accordance with the present invention can decide the moving obstacle 5a correctly by providing redundancy of decision to the static obstacle 5b showing the periodic movement.

Figure 2:
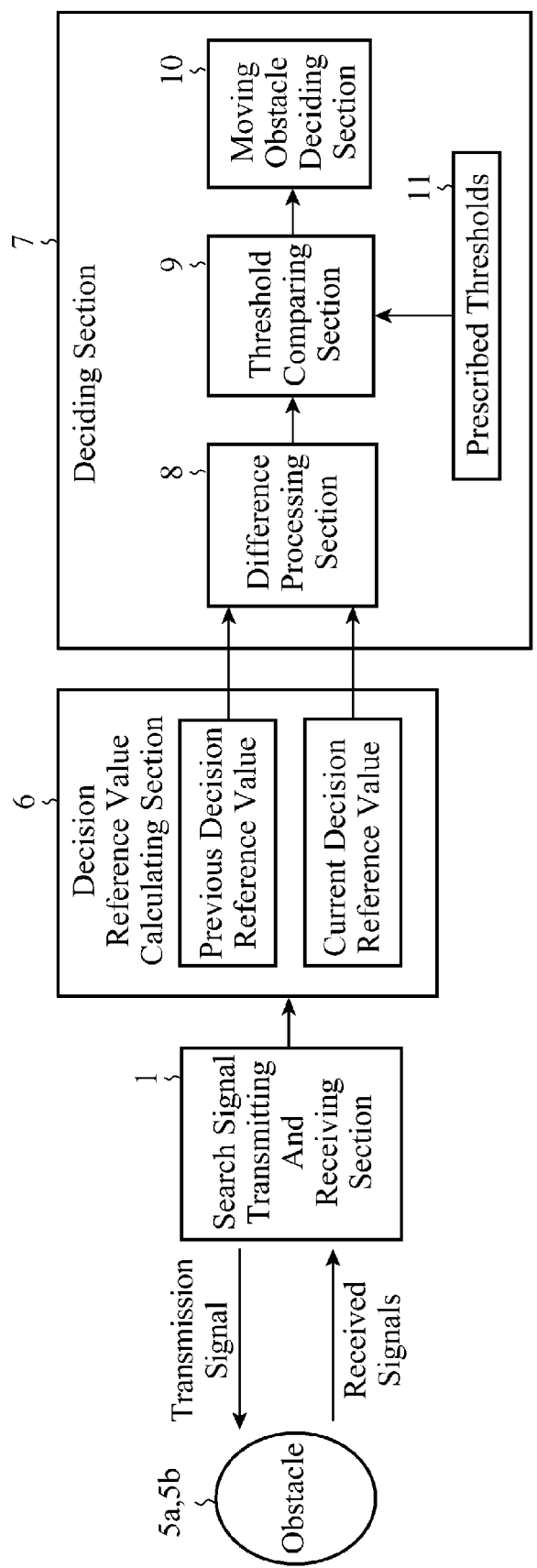
FIG. 2 is a block diagram showing a configuration of a moving obstacle deciding apparatus of an embodiment 1 in accordance with the present invention.

FIG. 2 is a block diagram showing a configuration of the moving obstacle deciding apparatus of the embodiment 1 in accordance with the present invention. In the following, explanation will be made by way of example which applies the moving obstacle deciding apparatus of the embodiment 1 to a sensor system for a vehicle having the search signal transmitting and receiving sections 1 mounted on door mirrors as shown in FIG. 1, and uses ultrasonic sensors as the search signal transmitting and receiving sections 1. The moving obstacle deciding apparatus of the embodiment 1 includes the search signal transmitting and receiving section 1, a decision reference value calculating section 6 and a deciding section 7. In addition, the deciding section 7 includes a difference processing section 8, a threshold comparing section 9, a moving obstacle deciding section 10 and a storage section 11 for storing prescribed thresholds.

The search signal transmitting and receiving section 1 transmits ultrasonic waves as a search signal, and receives a reflected signal (ultrasonic echo signal) of the search signal reflected from an obstacle 5a or 5b in the detection area to detect the obstacle 5a or 5b. The decision reference value calculating section 6 calculates the integral value of the reflected signal received by the search signal transmitting and receiving section 1 as a decision reference value, and outputs the decision reference value obtained by the previous ((n−1)th) search and the decision reference value obtained by the current (n-th) search to the deciding section 7.

According to the decision reference values input from the decision reference value calculating section 6, the deciding section 7 makes a decision as to whether the obstacle detected by the search signal transmitting and receiving section 1 is a moving obstacle or not. The difference processing section 8 obtains the difference value (absolute value) between the previous and current decision reference values input from the decision reference value calculating section 6 as a difference value between the decision reference values obtained by the time-series searches. The threshold comparing section 9 compares a prescribed threshold read out of the storage section 11 with the absolute value of the difference value input from the difference processing section 8, and outputs the compared result to the moving obstacle deciding section 10. According to the compared result fed from the threshold comparing section 9, the moving obstacle deciding section 10 makes a decision as to whether the obstacle detected by the search signal transmitting and receiving section 1 is a moving obstacle or not.

FIG. 3 is a block diagram showing a detailed configuration of the moving obstacle deciding apparatus of the embodiment 1. In FIG. 3(a), the search signal transmitting and receiving section 1 includes a sensor 12, a receiving amplifier 13, a full-wave rectifier section 14 and a transmitting section 15. The sensor 12, which is an ultrasonic sensor, transmits ultrasonic waves as the search signal and receives the reflected signals. The receiving amplifier 13 amplifies the reflected signals received by the sensor 12. The full-wave rectifier section 14 carries out the full-wave rectification of the output of the receiving amplifier 13. The transmitting section 15 notifies the sensor 12 and the decision reference value calculating section 6 of the transmission timing of the search signal (transmission signal). The transmission timing of the transmission signal is the integration start timing of an integrator 16 which will be described later, and becomes the reset timing of the previous integral value when obtaining the current decision reference value.

The decision reference value calculating section 6 includes the integrator 16 and a timer 17. The integrator 16 integrates the received signals fed from the search signal transmitting and receiving section 1 during a fixed period of time t0 counted by the timer 17, and outputs to the deciding section 7 as the decision reference value. The timer 17 starts counting the prescribed integration period t0 (turning on the timer signal in FIG. 3(b)) at the transmission timing of the transmission signal sent from the transmitting section 15, and outputs an integration stop signal (timer signal tuned off in FIG. 3(b)) to the integrator 16 and a NOT circuit 19 when the period t0 has elapsed.

The integrator 16 starts (sets) the integration processing when the timer 17 starts counting the period t0, and stores the current integral value into the storage section 18 and resets the integration processing when receiving the integration stop signal from the timer 17. As for the integration processing, it may be either analog or digital processing of the received signals. The digital processing requires an A/D converter for digitizing the output signal of the receiving amplifier 13. The storage section 18 stores the integral value fed from the integrator 16 as the previous ((n−1)th) decision reference value data.

The deciding section 7 includes the difference processing section 8, threshold comparing section 9, moving obstacle deciding section 10, storage section 11, NOT circuit 19 and an AND circuit 20. The difference processing section 8 obtains, as the difference value between the decision reference values obtained by the time-series searches, the difference value between the current (n-th) decision reference value input from the integrator 16 and the previous ((n−1)th) decision reference value readout of the storage section 18. The threshold comparing section 9 compares the prescribed threshold range read out of the storage section 11 with the difference value input from the difference processing section 8, and makes a decision as to whether the difference value is within the prescribed threshold range or not. When the difference value goes out of the prescribed threshold range, the threshold comparing section 9 outputs a signal with logical value 1 (true value) to the AND circuit 20.

The NOT circuit 19 has its output input to the AND circuit 20, and receives the integration stop signal (logical value 0, false value) from the timer 17. If the input signals from the threshold comparing section 9 and NOT circuit 19 are logical value 1 (true value), the AND circuit 20 outputs the signal with logical value 1 (true value) to the moving obstacle deciding section 10. In this way, at the timing when the integrator 16 completes the integration processing of a single search, the output of the threshold comparing section 9 is output to the moving obstacle deciding section 10 by the NOT circuit 19 and AND circuit 20.

A counting decision unit 10a in the moving obstacle deciding section 10, receiving the output value (logical value 1 (true value)) of the AND circuit 20, adds one every time the difference value gets out of the prescribed threshold range. The moving obstacle deciding section 10 makes a decision as to whether the obstacle is a moving obstacle or not according to the result of comparing the counting value of the counting decision unit 10a with a reference counting value N.

Next, the operation will be described.

In the following, as for the configuration of the moving obstacle deciding apparatus of the embodiment 1, FIG. 2 will be referred to.

First, the sensor 12 of the search signal transmitting and receiving section 1 transmits a search signal at the transmission timing input from the transmitting section 15, and receives reflected signals (ultrasonic echo signals) of the search signal from an obstacle. The signals received by the sensor 12 are amplified by the receiving amplifier 13 and then undergo full-wave rectification by the full-wave rectifier section 14.

The timer 17 starts counting the integration period t0 to be performed in a single search according to the transmission timing input from the transmitting section 15. The integrator 16 resets the previous integral value when the start of integration is informed from the timer 17, and integrates the received signals passing through the full-wave rectification by the full-wave rectifier section 14 during the period counted by the timer 17.

The difference processing section 8 calculates, as the difference value between the decision reference values obtained by the time-series searches, the absolute value of the difference value between the current decision reference value input from the integrator 16 and the previous decision reference value input from the storage section 18. The threshold comparing section 9 compares the threshold read out of the storage section 11 with the absolute value of the difference value input from the difference processing section 8, and makes a decision as to whether the difference value exceeds the threshold.

If the difference value of the difference processing section 8 is less than the threshold, the threshold comparing section 9 outputs a signal with logical value 0 (false value) to the AND circuit 20 as the threshold decision result signal. In contrast, if the difference value of the difference processing section 8 exceeds the threshold, the threshold comparing section 9 outputs the logical value 1 (true value) to the AND circuit 20 as the threshold decision result signal.

If the input signal from the threshold comparing section 9 is logical value 0 (false value), the AND circuit 20 outputs the signal with logical value 0 (false value) to the moving obstacle deciding section 10. If the output value of the AND circuit 20 is logical value 0 (false value), the counting decision unit 10a of the moving obstacle deciding section 10 does not increment the counting value.

If the input signals from the threshold comparing section 9 and NOT circuit 19 are logical value 1 (true value), the AND circuit 20 outputs the signal with logical value 1 (true value) to the moving obstacle deciding section 10. If the output value from the AND circuit 20 is logical value 1 (true value), the counting decision unit 10a adds one to the counting value.

On the other hand, the moving obstacle deciding section 10 makes a decision as to whether the difference value of the difference processing section 8 exceeds the threshold in N consecutive searches (reference counting value N). If the difference value of the difference processing section 8 exceeds the threshold in N consecutive searches, and thus the counting value of the counting decision unit 10a exceeds the reference counting value N, the moving obstacle deciding section 10 makes a decision that the detected obstacle is a moving obstacle 5a. The foregoing operation will be described in more detail below by taking a concrete example of the received signals (ultrasonic echo signals) from the obstacle.

(1) When Only Static Obstacle is Present

FIG. 4 is a diagram showing an example of the received signals obtained by the vehicle monitoring by the moving obstacle deciding apparatus in FIG. 2, which is applied to the vehicle monitoring system shown in FIG. 1. Here, FIG. 4(b) is an enlarged drawing of the signal enclosed by a symbol A in FIG. 4(a), and FIG. 4(c) is an enlarged drawing of the signal enclosed by the symbol B in FIG. 4(a). In addition, FIG. 5 is a diagram illustrating a condition in which the received signals in FIG. 4 are obtained, and shows a case where the static obstacle 5b is present in the detection area 4 of FIG. 1.

As shown in FIG. 5, when a static obstacle 5b such as a wall or another vehicle is present around the vehicle 2, multiple echoes occur from the static obstacle 5b for the search signal transmitted in the single search, and the sensor 12 of the search signal transmitting and receiving section 1 receives the received signals (reflected signals) n01 and n02 in the fixed period of time t0 as shown in FIG. 4(a). The received signals n01 and n02 received by the sensor 12 are an alternating current signal as shown in FIG. 4(b). The received signals n01 and n02 are amplified by the receiving amplifier 13, followed by the full-wave rectification by the full-wave rectifier section 14 as shown in FIG. 4(c).

On the other hand, according to the transmission timing input from the transmitting section 15, the timer 17 starts counting the integration period t0 to be performed by the single search. In addition, during the fixed period of time t0 counted by the timer 17, the integrator 16 integrates the received signals passing through the full-wave rectification by the full-wave rectifier section 14. Thus, an integral waveform (integral value V0) as shown in FIG. 4(a) is obtained. The integral waveform data from the integrator 16 is stored in the storage section 18 as the previous ((n−1)th) decision reference value data.

(2) When Moving Obstacle Approaches Vehicle

Next, a case will be described where the moving obstacle 5a approaching the vehicle 2 is detected in the foregoing condition (1).

Figure 6:
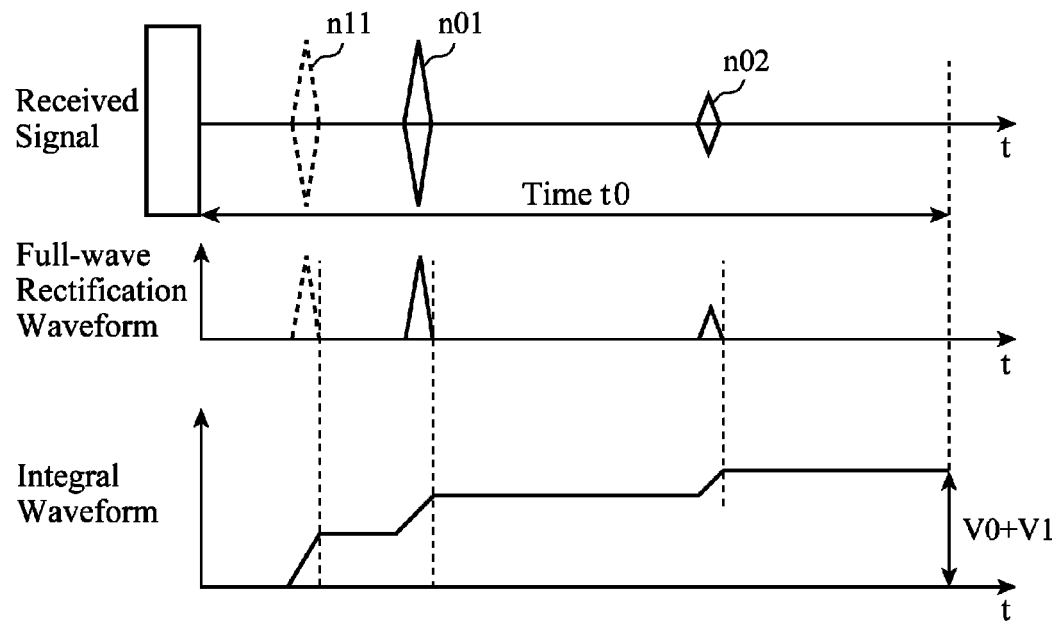
FIG. 6 is a diagram showing another example of the received signals obtained by the vehicle monitoring by the moving obstacle deciding apparatus in FIG. 2.

FIG. 6 is a diagram showing another example of the received signals obtained by the vehicle monitoring by the moving obstacle deciding apparatus in FIG. 2, which shows a case applied to the vehicle monitoring system shown in FIG. 1 as the case of FIG. 4. In addition, FIG. 7 is a diagram illustrating a condition in which the received signals in FIG. 6 are obtained, and shows a case where the moving obstacle approaches the vehicle 2 in the condition of the vehicle of FIG. 5.

Figure 7:
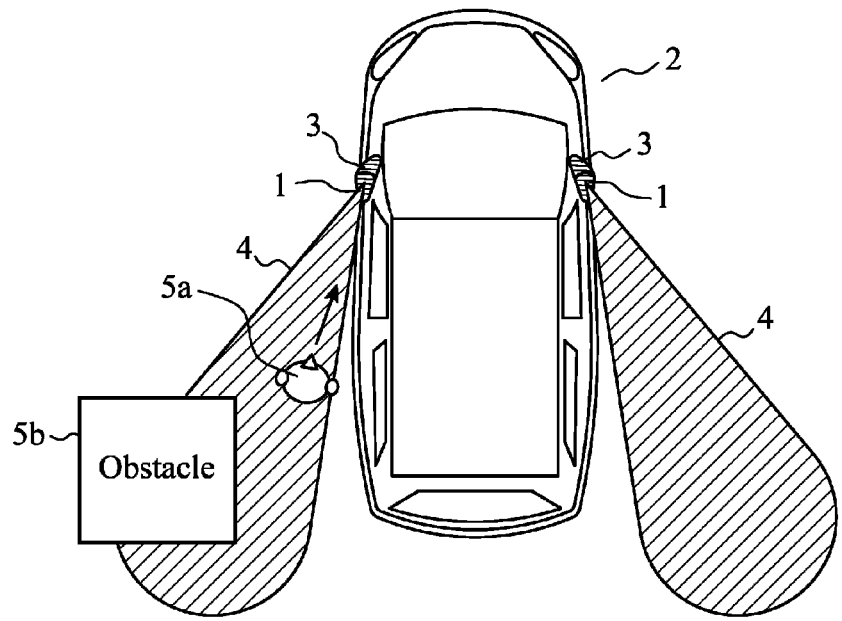
FIG. 7 is a diagram illustrating a condition in which the received signals in FIG. 6 are obtained.

When a moving obstacle 5a like a person approaches a position closer to the vehicle 2 than the static obstacle 5b (in the direction of an arrow in FIG. 7), the sensor 12 of the search signal transmitting and receiving section 1 receives, in the example shown in FIG. 7, a received signal (reflected signal) n11 from the moving obstacle 5a at timing earlier than the received signals n01 and n02 from the static obstacle 5b. The received signals n01, n02 and n11 are amplified by the receiving amplifier 13, followed by the full-wave rectification by the full-wave rectifier section 14.

On the other hand, according to the transmission timing of the transmission signal in the current search input from the transmitting section 15, the timer 17 starts counting the integration period t0. The integrator 16, receiving the notification of the start of integration from the timer 17, resets the previous ((n−1)th) integral value, and integrates the received signals passing through the full-wave rectification by the full-wave rectifier section 14 according to the current transmission timing of the transmission signal. Thus, the integral waveform (integral value V0+V1) as shown in FIG. 6 is obtained. The integral waveform data is output from the integrator 16 to the difference processing section 8 as the current (n-th) decision reference value data.

The difference processing section 8 calculates the difference value (V1) (absolute value) between the current (n-th) decision reference value (V0+V1) input from the integrator 16 and the previous ((n−1)th) decision reference value (V0) read out of the storage section 18. The threshold comparing section 9 compares the prescribed threshold read out of the storage section 11 with the absolute value of the difference value (V1) input from the difference processing section 8, and makes a decision as to whether the difference value (V1) exceeds the prescribed threshold. If the difference value (V1)

exceeds the prescribed threshold, the threshold comparing section 9 outputs the signal with logical value 1 (true value) to the AND circuit 20.

If the input signals from the threshold comparing section 9 and NOT circuit 19 are logical value 1 (true value), the AND circuit 20 outputs the signal with logical value 1 (true value) to the moving obstacle deciding section 10. Receiving the output value from the AND circuit 20 (logical value 1 (true value)), the counting decision unit 10a of the moving obstacle deciding section 10 adds one to the number of times of exceeding the threshold.

After that, the moving obstacle deciding apparatus of the embodiment 1 executes the search for the moving obstacle 5a and the foregoing decision processing continuously. Thus, if the counting value by the counting decision unit 10a exceeds the reference counting value N, the moving obstacle deciding section 10 makes a decision that the obstacle detected by the search signal transmitting and receiving section 1 is the moving obstacle 5a.

In this way, the moving obstacle deciding apparatus of the embodiment 1 can decide the moving obstacle 5a correctly considering variations in the detection signals obtained in the current and previous searches, that is, the continuity of the detection signals (reflected signals) obtained in time series.

(3) When Moving Obstacle Moves Away From Vehicle

Next, a case where the moving obstacle 5a moves away from the vehicle 2 in the foregoing (2) condition will be described.

Figure 8:
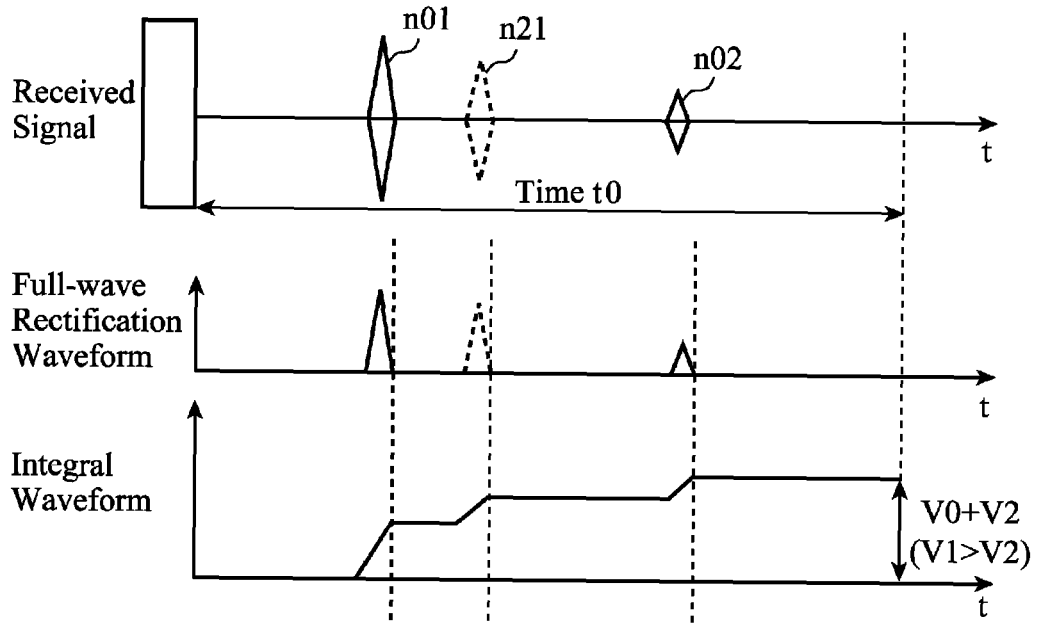
FIG. 8 is a diagram showing another example of the received signals obtained by the vehicle monitoring by the moving obstacle deciding apparatus in FIG. 2.
Figure 9:
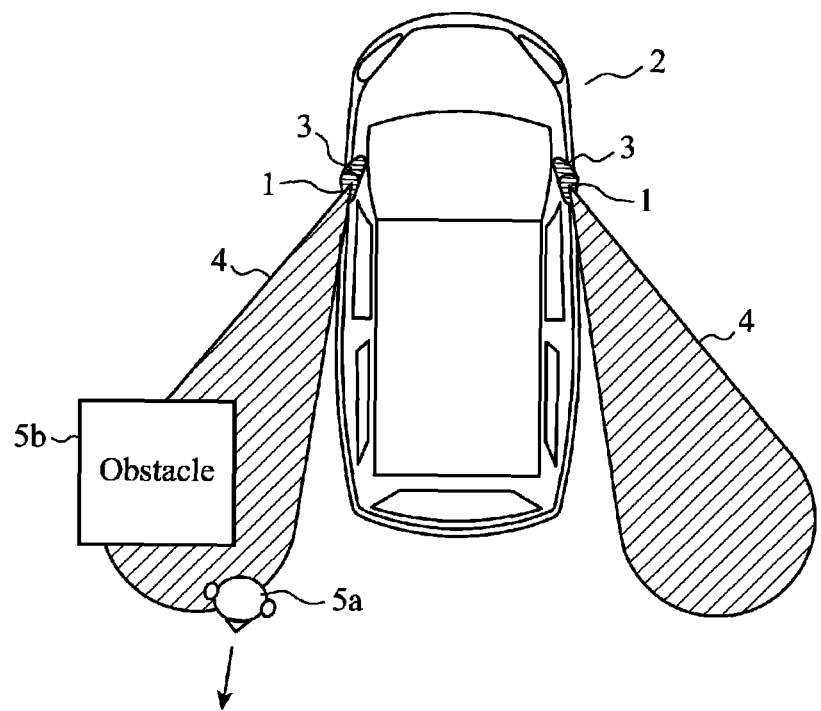
FIG. 9 is a diagram illustrating a condition in which the received signals in FIG. 8 are obtained.

FIG. 8 is a diagram showing another example of the received signals obtained by the vehicle monitoring by the moving obstacle deciding apparatus in FIG. 2, which shows a case applied to the vehicle monitoring system shown in FIG. 1 as the case of FIG. 4. In addition, FIG. 9 is a diagram illustrating a condition in which the received signals in FIG. 8 are obtained, and shows a case where the moving obstacle moves away from the vehicle 2 in the condition of the vehicle of FIG. 5.

When a moving obstacle 5a like a person moves farther away from the vehicle 2 than the static obstacle 5b (in the direction of the arrow in FIG. 9), the sensor 12 of the search signal transmitting and receiving section 1 receives, in the example shown in FIG. 8, a received signal (reflected signal) n21 from the moving obstacle 5a at timing later than the received signal n01 from the static obstacle 5b. The received signals n01, n02 and n21 are amplified by the receiving amplifier 13, followed by the full-wave rectification by the full-wave rectifier section 14.

On the other hand, according to the transmission timing of the transmission signal in the current search input from the transmitting section 15, the timer 17 starts counting the integration period t0. The integrator 16, receiving the notification of the start of integration from the timer 17, resets the previous ((n−1)th) integral value, and integrates the received signals passing through the full-wave rectification by the full-wave rectifier section 14. Thus, the integral waveform (integral value V0+V2) as shown in FIG. 8 is obtained, where V1>V2. The integral waveform data is output from the integrator 16 to the difference processing section 8 as the current (n-th) decision reference value data.

The difference processing section 8 calculates the difference value (V2) (absolute value) between the current (n-th) decision reference value (V0+V2) input from the integrator 16 and the previous ((n−1)th) decision reference value (V0) read out of the storage section 18. The threshold comparing section 9 compares the prescribed threshold read out of the storage section 11 with the absolute value of the difference value (V2) input from the difference processing section 8, and makes a decision as to whether the difference value (V2) exceeds the prescribed threshold. If the difference value (V2) exceeds the prescribed threshold, the threshold comparing section 9 outputs the signal with logical value 1 (true value) to the AND circuit 20 as the threshold decision result.

If the input signals from the threshold comparing section 9 and NOT circuit 19 are logical value 1 (true value), the AND circuit 20 outputs the signal with logical value 1 (true value) to the moving obstacle deciding section 10. Receiving the output value from the AND circuit 20 (logical value 1 (true value)), the counting decision unit 10a of the moving obstacle deciding section 10 adds one to the number of times of exceeding the threshold.

After that, the moving obstacle deciding apparatus of the embodiment 1 executes the search for the moving obstacle 5a and the foregoing decision processing continuously. If the counting value by the counting decision unit 10a exceeds the reference counting value N, the moving obstacle deciding section 10 makes a decision that the obstacle detected at the timing later than the case (2) is the moving obstacle 5a. Thus, it can detect that the moving obstacle 5a decided in (2) is moving away from the vehicle 2.

In addition, unless the difference value (V2) exceeds the prescribed threshold, the threshold comparing section 9 outputs the signal with logical value 0 (false value) to the AND circuit 20. When the input signal from the threshold comparing section 9 is logical value 0 (false value), the AND circuit 20 outputs the signal with logical value 0 (false value) to the moving obstacle deciding section 10. The counting decision unit 10a of the moving obstacle deciding section 10, receiving the output value of the AND circuit 20 with logical value 0 (false value), does not increment the counting value. If the number of times where the difference value (V2) does not exceed the prescribed threshold reaches a prescribed number, the moving obstacle deciding section 10 considers that the search target is erroneously detected as the moving obstacle 5a because of an unexpected factor such as noise, and decides that the search target is not the moving obstacle 5a.

As described above, according to the present embodiment 1, it includes the search signal transmitting and receiving section 1 for transmitting the search signal and for receiving the search signals reflected from the search target as the detection signals, the decision reference value calculating section 6 for calculating the decision reference value based on the detection signals received by the search signal transmitting and receiving section 1, and the moving obstacle deciding section 10 for making a decision as to whether the search target is the moving obstacle or not according to the result of comparing the difference value between the decision reference values obtained by the time-series searches by the decision reference value calculating section 6 with the prescribed threshold. With such a configuration, it can decide as to whether the search target is the moving obstacle 5a or not correctly according to the movement of the search target estimated from the continuity of the variations in the detection signals obtained by the time-series searches, that is, from the continuity of the variations in the detection signals (reflected signals) obtained in time series.

In addition, according to the foregoing embodiment 1, it has the counting decision unit 10a for counting the number of times the difference value exceeds the prescribed threshold, and the moving obstacle deciding section 10 makes a decision that the search target is the moving obstacle 5a if the counting value of the counting decision unit 10a exceeds the prescribed number of times. This can prevent the target object from being erroneously decided as the moving obstacle 5a because of unexpected noise.

Furthermore, according to the foregoing embodiment 1, since the decision reference value calculating section 6 employs the integral value of the detection signals during the prescribed period as the decision reference value, it can obtain the decision reference values including the variations in the time-series detection signals, and hence can grasp the variations in the time-series detection signals appropriately.

Embodiment 2

Figure 10:
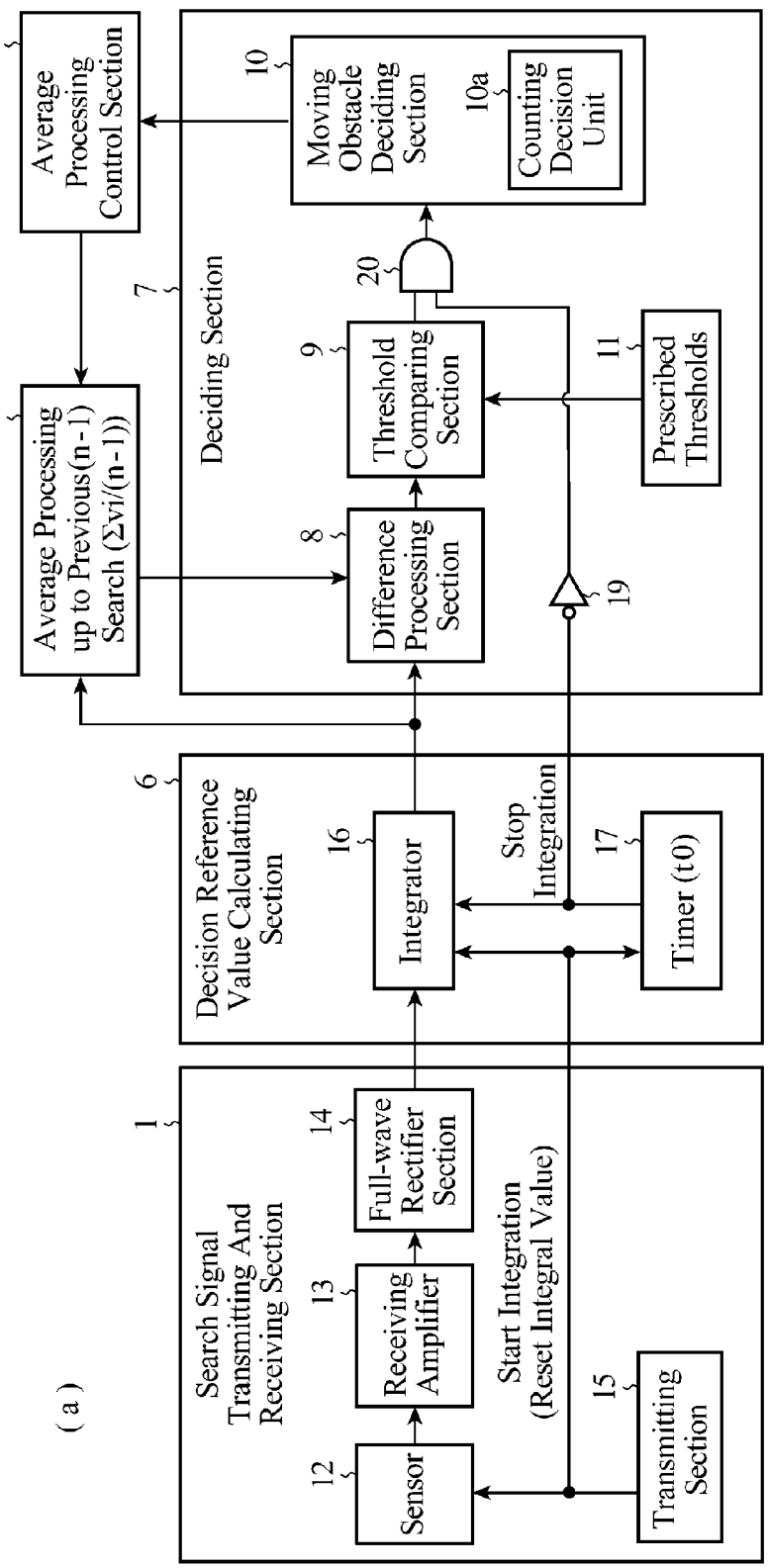
FIG. 10 is a block diagram showing a configuration of a moving obstacle deciding apparatus of an embodiment 2 in accordance with the present invention.

FIG. 10 is a block diagram showing a configuration of a moving obstacle deciding apparatus of an embodiment 2 in accordance with the present invention. In FIG. 10, the moving obstacle deciding apparatus of the present embodiment 2 has, besides the configuration shown in FIG. 3 of the foregoing embodiment 1, an averaging processing section 21 and an averaging processing control section 22.

The averaging processing section 21 calculates an average value of the decision reference values (integral values of the received signals) obtained by the integrator 16 through the prescribed number of time-series searches up to the previous ((n−1)th) search. The averaging processing employs as the decision reference value the average value of the integral values of the received signals obtained by the prescribed number of searches up to the previous search, or the moving average value for the prescribed number of searches. According to the decision result by the moving obstacle deciding section 10, the averaging processing control section 22 carries out its control in such a manner as to fix the decision reference value to be output to the difference processing section 8 by halting the averaging processing by the averaging processing section 21, or to calculate a new average value as the decision reference value by restarting the averaging processing.

In addition, in the present embodiment 2, a prescribed threshold range has been stored in the storage section 11, and the threshold comparing section 9 compares the prescribed threshold range with the difference value between the decision reference values. The moving obstacle deciding section 10 makes a decision that the obstacle which is being detected by the search signal transmitting and receiving section 1 is a moving obstacle if the difference value calculated by the difference processing section 8 exceeds the upper limit value of the threshold range, or if the number of times the difference value is less than the lower limit value exceeds a prescribed reference number of times. Incidentally, as for the other components, since they are the same as those shown in FIG. 3 of the foregoing embodiment 1, their description will be omitted here.

Next, the operation will be described.

In the following, an example will be described which applies the moving obstacle deciding apparatus of the embodiment 2 to the vehicle monitoring system of the foregoing embodiment 1 shown in FIG. 1.

First, the sensor 12 of the search signal transmitting and receiving section 1 transmits the search signal at the transmission timing input from the transmitting section 15, and receives the reflected signals (ultrasonic echo signals) of the search signal from the obstacle. The signals received by the sensor 12 are amplified by the receiving amplifier 13 and then undergo full-wave rectification by the full-wave rectifier section 14.

The timer 17 starts counting the integration period t0 to be performed in a single search according to the transmission timing input from the transmitting section 15. The integrator 16 resets the previous integral value when the start of integration is informed from the timer 17, and integrates the received signals passing through the full-wave rectification by the full-wave rectifier section 14 during the period counted by the timer 17.

On the other hand, the averaging processing section 21 calculates the average value ($\Sigma Vi/(n-1)$) of the integral values Vi of the received signals up to the previous search using the integral values of the individual received signals obtained by the prescribed number of time-series searches up to the previous search input from the integrator 16, and stores it as the decision reference value up to the previous search.

The difference processing section 8 calculates, as the difference value between the decision reference values obtained by the time-series searches, the difference value between the current decision reference value input from the integrator 16 and the decision reference value up to the previous search input from the averaging processing section 21. The threshold comparing section 9 compares the threshold range read out of the storage section 11 with the difference value input from the difference processing section 8, and makes a decision as to whether the difference value exceeds the upper limit value of the threshold range or becomes less than the lower limit value.

Figure 11:
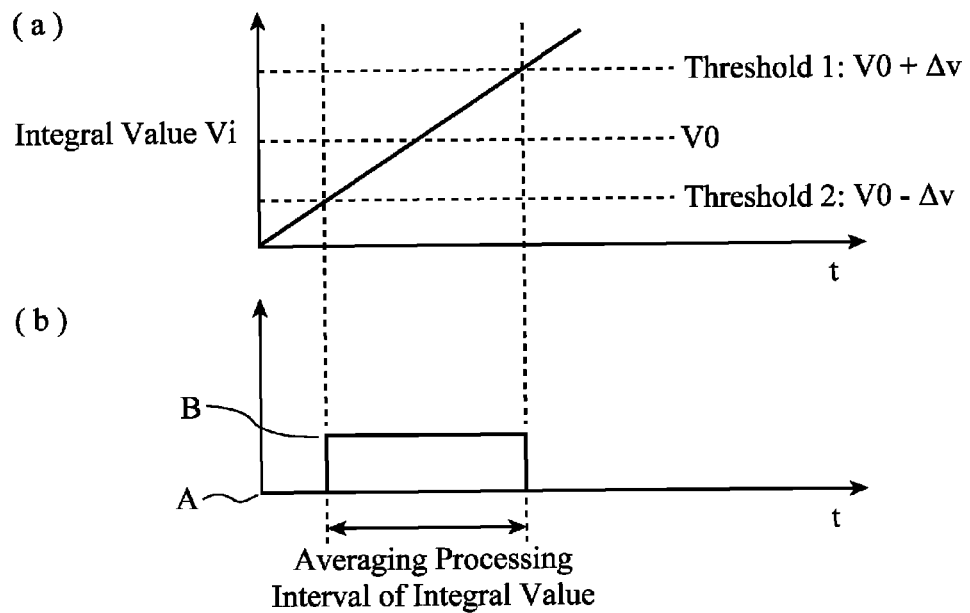
FIG. 11 is a diagram illustrating threshold deciding processing of the embodiment 2.

FIG. 11 is a diagram illustrating the threshold deciding processing of the embodiment 2: FIG. 11($a$) shows a variation of the integral value of the received signal with respect to time; and FIG. 11($b$) shows the threshold decision result. As shown in FIG. 11($a$), when the difference value from the difference processing section 8 is within the threshold range whose upper limit value (threshold 1) is V0+$\Delta$V, and lower limit value (threshold 2) is V0−$\Delta$V, the embodiment 2 decides that the reflected signals (received signals) do not have a variation indicating the movement of the obstacle and hence it is not the moving obstacle 5$a$.

Incidentally, as to a person approaching the vehicle, a case can sometimes occur in which the received signal intensity is reduced because clothes with low reflectance become reflecting areas. Accordingly, considering such a case where the received intensity of the reflected signal reduces even if the moving obstacle 5$a$ approaches the vehicle 2, the threshold 2 indicating the lower limit value of the threshold range is provided.

When the difference value of the difference processing section 8 is within the threshold range, the threshold comparing section 9 outputs a signal with logical value 0 (false value) to the AND circuit 20 as the threshold decision result signal as designated by the symbol B in FIG. 11($b$). In contrast, when the difference value of the difference processing section 8 exceeds the threshold 1 of the threshold range or is less than the threshold 2, threshold comparing section 9 outputs the logical value 1 (true value) to the AND circuit 20 as the threshold decision result signal as designated by the symbol A in FIG. 11($b$).

If the input signal from the threshold comparing section 9 is logical value 0 (false value), the AND circuit 20 outputs the signal with logical value 0 (false value) to the moving obstacle deciding section 10. If the counting decision unit 10$a$ of the moving obstacle deciding section 10 receives the output value with logical value 0 (false value) from the AND circuit 20, it does not increment the counting value. Furthermore, the moving obstacle deciding section 10 notifies the averaging processing control section 22 that the counting decision unit 10$a$ does not increment the counting value.

If the output value of the AND circuit 20 is logical value 1 (true value), the counting decision unit 10$a$ adds one to the counting value. When the counting decision unit 10$a$ increments the counting value, the moving obstacle deciding section 10 notifies the averaging processing control section 22 of that.

If the difference value of the difference processing section 8 goes out of the threshold range and the counting value is incremented, the averaging processing control section 22 controls the averaging processing section 21 so as to halt the averaging processing. Thus, the decision reference value, which is to be subjected to the difference processing between it and the next and subsequent decision reference values, is fixed to the average value of the integral values of the received signals up to the previous one. The reason for fixing the decision reference value to the average value of the integral values of the received signals up to the previous one is that the received signals caused by the moving obstacle 5a is to be excluded from the next and subsequent decision reference values.

On the other hand, the moving obstacle deciding section 10 makes a decision as to whether the difference value of the difference processing section 8 goes out of the threshold range in N consecutive searches (reference counting value N). If the difference value of the difference processing section 8 enters the threshold range here, the moving obstacle deciding section 10 notifies the averaging processing control section 22 of that. Receiving the notification from the moving obstacle deciding section 10, the averaging processing control section 22 controls the averaging processing section 21 to restart the averaging processing. Thus, the average value including the integral value of the current received signals is calculated as the decision reference value to be subjected to the difference processing between it and the next and subsequent decision reference values.

Incidentally, in the foregoing explanation, although a case is described where the averaging processing section 21 restarts the averaging processing if the absolute value of the difference value between the previous decision reference value and the current decision reference value falls within the threshold range even once, a configuration is also possible where the averaging processing section 21 restarts the averaging processing when the number of times of falling within the threshold range becomes a prescribed number of times (twice or more).

If the difference value of the difference processing section 8 goes out of the threshold range in N consecutive searches, and hence the counting value of the counting decision unit 10a exceeds the reference counting value N, the moving obstacle deciding section 10 makes a decision that the detected obstacle is the moving obstacle 5a. In contrast, unless it goes out of the threshold range in N consecutive searches, but falls within the threshold range, the moving obstacle deciding section 10 considers that the obstacle detected is erroneously detected as the moving obstacle 5a because of the unexpected factor such as noise, and hence does not decide that it is the moving obstacle 5a.

As described above, according to the present embodiment 2, it includes the averaging processing section 21 for calculating the average value or moving average value of the integral values of the detection signals obtained by the prescribed number of time-series searches up to the previous search, and the decision reference value calculating section 6 obtains the difference value between the average value or moving average value calculated by the averaging processing section 21 and the integral value of the detection signals obtained by the current search, and makes a decision as to whether the search target is the moving obstacle or not from the compared result of the difference value and the prescribed threshold. This makes it possible to decide as to whether the search target is the moving obstacle 5a or not correctly from the movement of the search target estimated from the continuity of the variations of the detection signals (reflected signals) obtained in time series in the same manner as the foregoing embodiment 1. In addition, by taking the average value or moving average value of the integral values of the detection signals obtained in the prescribed number of searches up to the previous search, since the noise is averaged even if unexpected noise is received as the detection signals, the moving obstacle 5a can be decided correctly.

In addition, according to the foregoing embodiment 2, the averaging processing section 21 stops the averaging processing when the difference value between the average value or moving average value of the integral values of the detection signals obtained through the prescribed number of searches up to the previous search and the integral value of the detection signals calculated in the current search exceeds the prescribed threshold, and the moving obstacle deciding section 10 fixes the target, the differences between which target and the integral values of the detection signals obtained by the next and subsequent searches are to be taken, to the average value or moving average value of the integral values of the detection signals obtained through the prescribed number of searches up to the previous search until the averaging processing section 21 restarts its averaging processing. In this way, when detecting the moving obstacle 5a, the detection accuracy of the moving obstacle 5a by the search signal transmitting and receiving section 1 can be improved without using the integral values of the detection signals.

Furthermore, according to the foregoing embodiment 2, the averaging processing section 21 restarts the averaging processing when the number of times the difference values between the average value or moving average value of the integral values of the detection signals obtained through the prescribed number of searches up to the previous search and the integral values of the detection signals calculated in the current and subsequent searches do not go beyond the prescribed thresholds continues a prescribed number of times. This makes it possible to contain the integral value of the latest detection signals after the moving obstacle 5a goes out of detection into the decision reference value, thereby being able to improve the detection accuracy of the moving obstacle 5a in the following search.

Moreover, according to the foregoing embodiment 2, the prescribed thresholds stored in the storage section 11 have two values of the upper limit and lower limit, and the moving obstacle deciding section 10 makes a decision that the search target is the moving obstacle 5a if the difference value between the previous and current decision reference values exceeds the upper limit value of the prescribed threshold or becomes less than the lower limit value. Thus, even if the static obstacle 5b and the moving obstacle 5a overlap, and the received level of the detection signal reduces because of the low reflectance of the moving obstacle 5a for the search signal, it can grasp the increase or decrease of the integral value of the detection signals by comparing it with the lower limit value of the threshold, thereby being able to decide as to whether the search target is a moving obstacle or not correctly.

Embodiment 3

The present embodiment 3 maps the detection area onto prescribed divisions, obtains the integral value of the detection signals for each divisional area, sets a specific or fixed threshold for each divisional area, and decides that the obstacle is a moving obstacle when the number of times the difference value between the integral values of the current and previous received signals exceeds the threshold exceeds a certain value.

Figure 12:
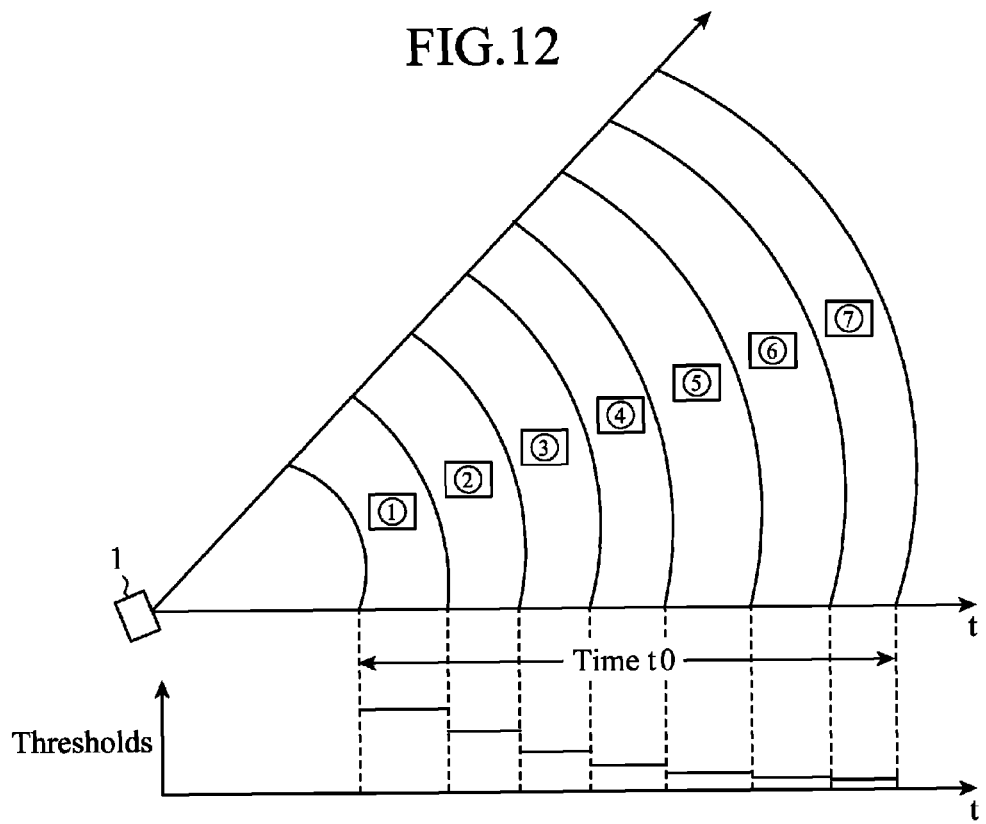
FIG. 12 is a diagram illustrating threshold deciding processing of an embodiment 3 in accordance with the present invention.

FIG. 12 is a diagram illustrating the threshold deciding processing by the embodiment 3 in accordance with the present invention. As shown in the upper part of FIG. 12, the embodiment 3 divides the detection area of the search signal transmitting and receiving section 1 formed in a fixed period of time t0 into divisional areas 1-7 at every prescribed distance (time). For example, according to the time from the transmission of the search signal to the reception of its reflected signal, the distance from the search signal transmitting and receiving section 1 to the search target is calculated, and the detection area of the search signal transmitting and receiving section 1 is divided into the divisional areas 1-7 in accordance with the distance or time.

As shown in the lower part of FIG. 12, an integration start and end period corresponding to each of the divisional areas 1-7 is set to a timer 17a. An integrator 16a calculates the integral value of the received signals during the integration period of each of the divisional areas 1-7 measured by the timer 17a. In addition, specific thresholds are set to the divisional areas 1-7, respectively. For example, as shown in the lower part of FIG. 12, a greater threshold is set to a divisional area closer to the search signal transmitting and receiving section 1 than a divisional area distant from it.

This makes it possible to decide the moving obstacle 5a for each of the divisional areas 1-7, and to obtain, when the moving obstacle 5a is detected, its positional information correctly. In addition, since the threshold of each divisional area is set to become smaller as it separates from the search signal transmitting and receiving section 1, it can detect the moving obstacle 5a appearing at a distant place correctly.

Incidentally, the divisional areas 1-7 can be set at fixed intervals or at any given intervals. For example, the intervals between the divisional areas can be made smaller as the distance from the vehicle is shorter, which enables improvement of the position recognition accuracy of the moving obstacle 5a. In addition, the threshold of each of the divisional areas 1-7 is set in accordance with the propagation distance (or propagation time) of the search signal (ultrasonic waves) from the search signal transmitting and receiving section 1. For example, values obtained by multiplexing the propagation distance attenuation coefficients of the ultrasonic wave signal by a prescribed value, or any given values can be used as the thresholds of the divisional areas 1-7.

Figure 13:
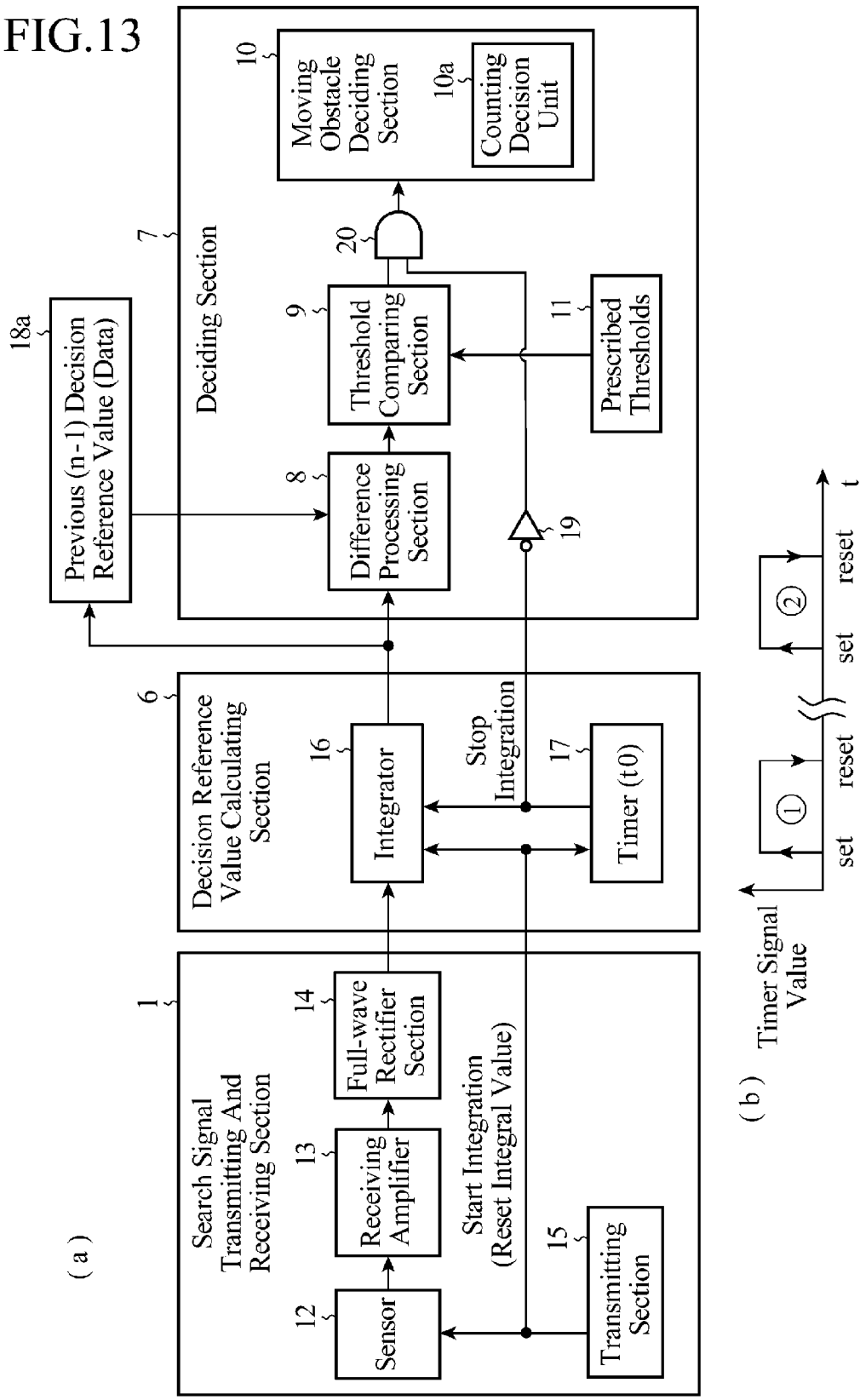
FIG. 13 is a block diagram showing a configuration of a moving obstacle deciding apparatus of the embodiment 3.

FIG. 13 is a block diagram showing a configuration of a moving obstacle deciding apparatus of the embodiment 3. In FIG. 13(a), the moving obstacle deciding apparatus of the embodiment 3 has, besides the configuration shown in FIG. 3 of the foregoing embodiment 1, the integrator 16a, the timer 17a, and storage sections 11a and 18a. As shown in FIG. 13(b), the integrator 16a starts the integration processing when the time measurement of each of the divisional areas 1-7 in FIG. 12 is started by the timer 17a, and stores, when receiving the integration stop signal from the timer 17a, the integral value of the current received signals for each of the divisional areas 1-7 into the storage section 18a, and resets the integration processing.

The timer 17a starts counting the prescribed integration period t0 at the transmission timing of the transmission signal informed from the transmitting section 15, times the periods corresponding to each of the divisional areas 1-7 in FIG. 12 during the period t0, and outputs a signal (set, logical value 1) indicating the start of the integration processing and a signal (reset, logical value 0) indicating the stop thereof at each of the divisional areas 1-7 to the integrator 16a and NOT circuit 19. The storage section 11a stores the thresholds which are used in the comparing processing by the threshold comparing section 9, and are specific for the divisional areas 1-7, respectively.

In addition, the storage section 18a stores the integral values of the received signals for each of the divisional areas 1-7 input from the integrator 16a as the previous ((n−1)th) decision reference value data for each of the divisional areas 1-7. Incidentally, as for the other components, since they are the same as those shown in FIG. 3 of the foregoing embodiment 1, their description will be omitted here.

Next, the operation will be described.

First, the sensor 12 of the search signal transmitting and receiving section 1 transmits the search signal at the transmission timing input from the transmitting section 15, and receives the reflected signals (ultrasonic echo signals) of the search signal from the obstacle. The signals received by the sensor 12 are amplified by the receiving amplifier 13 and then undergo full-wave rectification by the full-wave rectifier section 14.

The timer 17a starts counting the integration period t0 to be performed in a single search according to the transmission timing input from the transmitting section 15, and times the start and end of each of the divisional areas 1-7. The integrator 16a resets the previous integral value every time the start of integration of each of the divisional areas 1-7 is informed from the timer 17a, and integrates the received signals passing through the full-wave rectification by the full-wave rectifier section 14 during the period corresponding to each of the divisional areas 1-7 counted by the timer 17a.

The difference processing section 8 calculates, as the difference value between the decision reference values obtained by the time-series searches, the difference value between the current decision reference value input from the integrator 16a and the previous decision reference value input from the storage section 18a for each of the divisional areas 1-7. The threshold comparing section 9 compares the threshold specific for each of the divisional areas 1-7 read out of the storage section 11a with the difference values of each of the divisional areas 1-7 input from the difference processing section 8, and makes a decision as to whether the difference value exceeds the threshold for each of the divisional areas 1-7.

In the threshold decision for each of the divisional areas 1-7, if the difference value of the difference processing section 8 is less than the threshold, the threshold comparing section 9 outputs a signal with logical value 0 (false value) to the AND circuit 20 as the threshold decision result signal for each of the divisional areas 1-7. In contrast, if the difference value of the difference processing section 8 exceeds the threshold of the corresponding divisional area 1-7, the threshold comparing section 9 outputs the logical value 1 (true value) to the AND circuit 20 as the threshold decision result signal for each of the divisional areas 1-7.

If the input signal from the threshold comparing section 9 is logical value 0 (false value), the AND circuit 20 outputs the signal with logical value 0 (false value) to the moving obstacle deciding section 10. If the output value of the AND circuit 20 is logical value 0 (false value), it does not increment the counting value.

If the input signals from the threshold comparing section 9 and NOT circuit 19 are logical value 1 (true value), the AND circuit 20 outputs the signal with logical value 1 (true value) to the moving obstacle deciding section 10. If the output value from the AND circuit 20 is logical value 1 (true value), the counting decision unit 10a adds one to the counting value of the divisional area.

On the other hand, the moving obstacle deciding section 10 makes a decision as to whether the difference value of the difference processing section 8 exceeds the threshold of the corresponding divisional area in N consecutive searches (reference counting value N) in the threshold decision of each of the divisional areas 1-7. If the difference value of the difference processing section 8 exceeds the threshold of the corresponding divisional area in N consecutive searches (reference counting value N), and the counting value of the counting decision unit 10a exceeds the reference counting value N, the moving obstacle deciding section 10 makes a decision that the obstacle detected in the divisional area is the moving obstacle 5a. The foregoing operation will be described in more detail by giving a concrete example of the received signals (ultrasonic echo signals) from the obstacle.

(1) When Only Static Obstacle is Present

Figure 14:
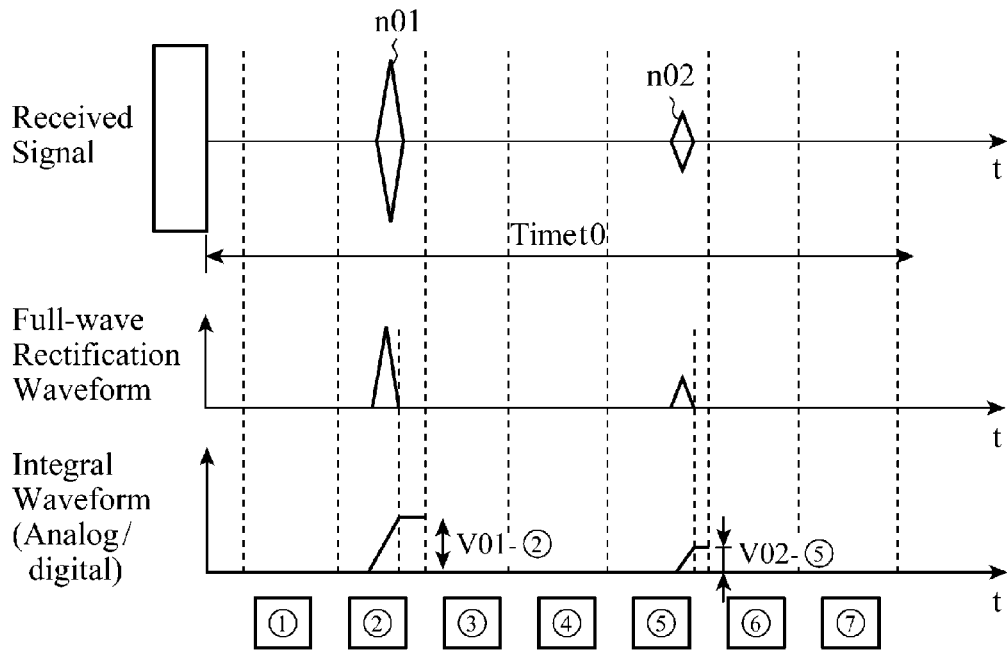
FIG. 14 is a diagram showing an example of the received signals obtained by the vehicle monitoring by the moving obstacle deciding apparatus in FIG. 13.

FIG. 14 is a diagram showing an example of the received signals obtained by the vehicle monitoring by the moving obstacle deciding apparatus in FIG. 13, which is applied to the vehicle monitoring system shown in FIG. 1. When there is a static obstacle 5b near the vehicle 2, multiple echoes occur from the static obstacle 5b for the search signal transmitted in a single search, and the sensor 12 of the search signal transmitting and receiving section 1 receives the received signals (reflected signals) n01 and n02 during the fixed period of time t0 as shown in FIG. 14.

The received signals n01 and n02 received by the sensor 12 are an alternating current signal as shown in FIG. 4(b). The received signals n01 and n02 are amplified by the receiving amplifier 13, followed by the full-wave rectification by the full-wave rectifier section 14 as shown in FIG. 14.

On the other hand, according to the transmission timing of the transmission signal input from the transmitting section 15, the timer 17a starts counting the integration period t0 to be performed by the single search, and times the start and end of each of the divisional areas 1-7. The integrator 16 integrates the received signals passing through the full-wave rectification by the full-wave rectifier section 14 during the periods corresponding to each of the divisional areas 1-7 timed by the timer 17a.

Thus, as shown in FIG. 14, the integral value V01 corresponding to the received signal n01 is obtained in the divisional area 2, and the integral value V02 corresponding to the received signal n02 is obtained in the divisional area 5. The integral waveform data including the data of the divisional areas without any integral value is stored from the integrator 16a to the storage section 18a as the previous ((n−1)th) decision reference value data of each of the divisional areas 1-7.

(2) When Moving Obstacle Approaches Vehicle

Next, a case will be described where the moving obstacle 5a approaching the vehicle 2 is detected in the foregoing condition (1).

Figure 15:
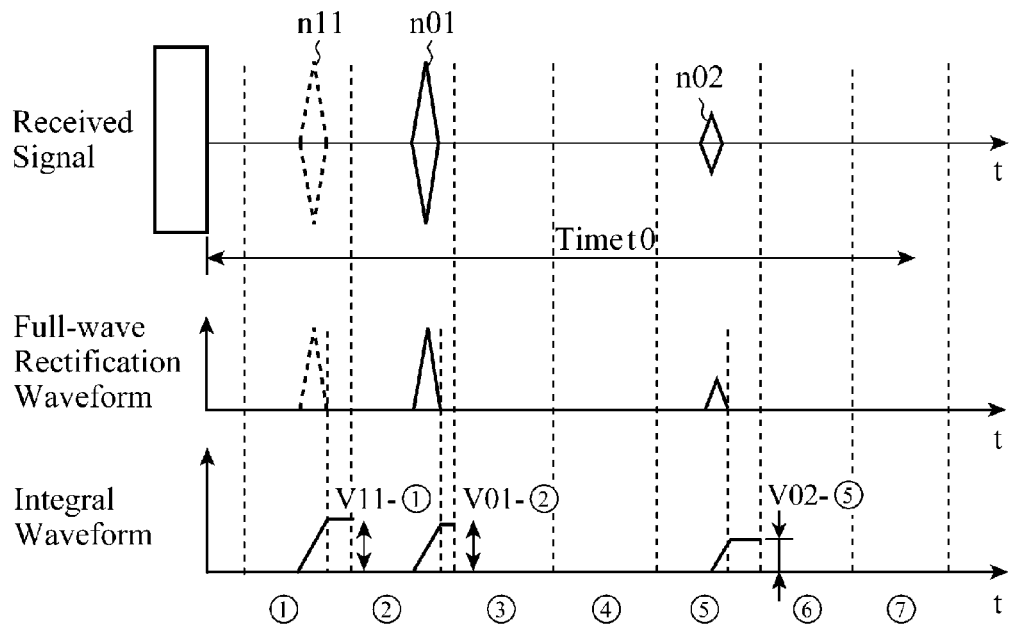
FIG. 15 is a diagram showing another example of the received signals obtained by the vehicle monitoring by the moving obstacle deciding apparatus in FIG. 13.

FIG. 15 is a diagram showing another example of the received signals obtained by the vehicle monitoring by the moving obstacle deciding apparatus in FIG. 13, which shows a case applied to the vehicle monitoring system shown in FIG. 1 as the case of FIG. 14. When the moving obstacle 5a like a person approaches the vehicle 2 closer than the static obstacle 5b, the sensor 12 of the search signal transmitting and receiving section 1 receives a received signal (reflected signal) n11 from the moving obstacle 5a at timing (divisional area 1) earlier than the received signals n01 and n02 from the static obstacle 5b. The received signals n01, n02 and n11 are amplified by the receiving amplifier 13, followed by the full-wave rectification by the full-wave rectifier section 14.

On the other hand, according to the transmission timing input from the transmitting section 15, the timer 17a starts counting the integration period t0 to be performed in a single search, and times the start and end of each of the divisional areas 1-7. The integrator 16, receiving the notification of the start of integration from the timer 17a for each of the divisional areas 1-7, resets the previous ((n−1)th) integral value, and integrates the received signals passing through the full-wave rectification by the full-wave rectifier section 14 during the period corresponding to each of the divisional areas 1-7, which is counted by the timer 17a.

Thus, as shown in FIG. 15, besides the integral values of the received signals n01 and n02 from the static obstacle 5b, an integral value V11 of the received signal n11 is obtained in the period corresponding to the divisional area 1. The integral waveform data shown in FIG. 15 is output from the integrator 16a to the difference processing section 8 as the current (n-th) decision reference value data for each of the divisional areas 1-7.

The difference processing section 8 calculates the difference value (absolute value) between the current (n-th) decision reference value of each of the divisional areas 1-7 input from the integrator 16 and the previous ((n−1)th) decision reference value of each of the divisional areas 1-7 read out of the storage section 18. The threshold comparing section 9 compares the threshold specific for each of the divisional areas 1-7 read out of the storage section 11 with the absolute value of the difference value of each of the divisional areas 1-7 input from the difference processing section 8, and makes a decision as to whether the difference value exceeds the prescribed threshold for each of the divisional areas 1-7. If the difference value in the divisional area 1 exceeds the threshold, the threshold comparing section 9 outputs the signal with logical value 1 (true value) to the AND circuit 20 as the decision result of the divisional area 1.

If the input signals from the threshold comparing section 9 and NOT circuit 19 are logical value 1 (true value), the AND circuit 20 outputs the signal with logical value 1 (true value) to the moving obstacle deciding section 10. Receiving the output value from the AND circuit 20 (logical value 1 (true value)), the counting decision unit 10a of the moving obstacle deciding section 10 adds one to the number of times of exceeding the threshold.

After that, the moving obstacle deciding apparatus of the embodiment 3 executes the search for the moving obstacle 5a and the foregoing decision processing continuously. Thus, if the counting value of the divisional area 1 by the counting decision unit 10a exceeds the reference counting value N, the moving obstacle deciding section 10 makes a decision that the obstacle detected in the divisional area 1 by the search signal transmitting and receiving section 1 is the moving obstacle 5a.

(3) When Moving Obstacle Moves Away from Vehicle

Next, a case where the moving obstacle 5a moves away from the vehicle 2 in the foregoing (2) condition.

Figure 16:
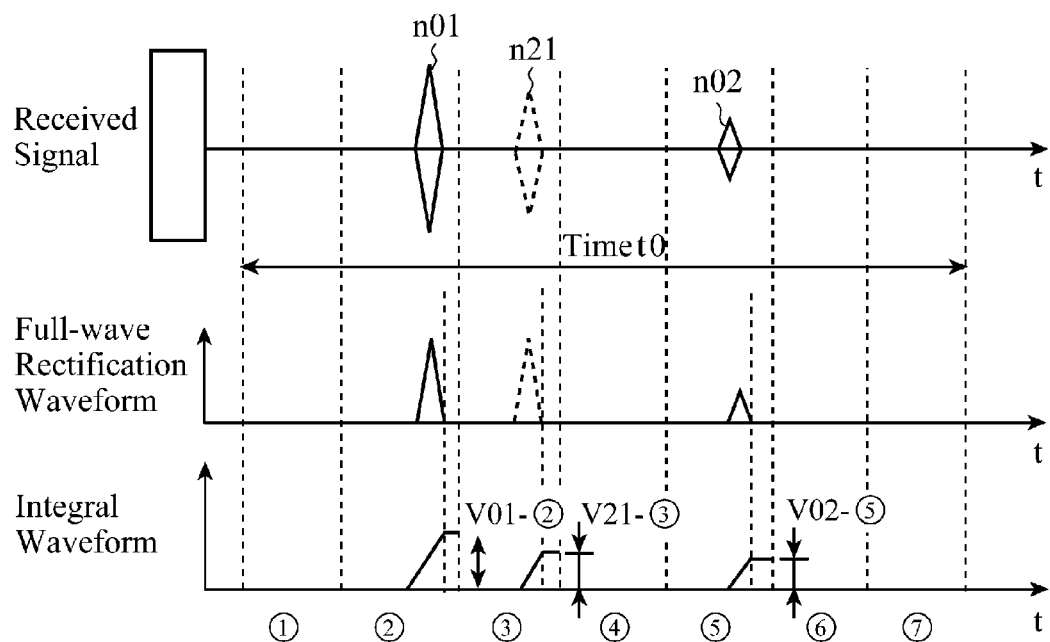
FIG. 16 is a diagram showing another example of the received signals obtained by the vehicle monitoring by the moving obstacle deciding apparatus in FIG. 13.

FIG. 16 is a diagram showing another example of the received signals obtained by the vehicle monitoring by the moving obstacle deciding apparatus in FIG. 13, which shows a case applied to the vehicle monitoring system as shown in FIG. 1 just as the case of FIG. 14. When a moving obstacle 5a like a person moves farther away from the vehicle 2 than the static obstacle 5b, the sensor 12 of the search signal transmitting and receiving section 1 receives a received signal (reflected signal) n21 from the moving obstacle 5a at timing later than the received signal n01 from the static obstacle 5b (in the divisional area 3 farther away from the search signal transmitting and receiving section 1 than the divisional area 1). The received signals n01, n02 and n21 are amplified by the receiving amplifier 13, followed by the full-wave rectification by the full-wave rectifier section 14.

On the other hand, according to the transmission timing input from the transmitting section 15, the timer 17a starts counting the integration period t0 to be performed by the single search, and times the start and end of each of the divisional areas 1-7. The integrator 16a, receiving the notification of the start of integration for each of the divisional areas 1-7 from the timer 17a, resets the previous ((n−1)th) integral value, and integrates the received signals passing through the full-wave rectification by the full-wave rectifier section 14 during the period corresponding to each of the divisional areas 1-7 counted by the timer 17a.

Thus, as shown in FIG. 16, besides the integral values of the received signals n01 and n02 from the static obstacle 5b, an integral value V21 of the received signal n21 is obtained in the period corresponding to the divisional area 3. The integral waveform data shown in FIG. 16 is output from the integrator 16a to the difference processing section 8 as the current (n-th) decision reference value data for each of the divisional areas 1-7.

The difference processing section 8 calculates the difference value (absolute value) between the current (n-th) decision reference value of each of the divisional areas 1-7 input from the integrator 16a and the previous ((n−1)th) decision reference value of each of the divisional areas 1-7 read out of the storage section 18a. The threshold comparing section 9 compares the threshold specific for each of the divisional areas 1-7 readout of the storage section 11a with the absolute value of the difference value of each of the divisional areas 1-7 input from the difference processing section 8, and makes a decision as to whether the difference value exceeds the threshold or not for each of the divisional areas 1-7. Here, since the difference value in the divisional area 3 exceeds the threshold, the threshold comparing section 9 outputs the signal with logical value 1 (true value) to the AND circuit 20 as the decision result of the divisional area 3.

If the input signals from the threshold comparing section 9 and NOT circuit 19 are logical value 1 (true value), the AND circuit 20 outputs the signal with logical value 1 (true value) to the moving obstacle deciding section 10. Receiving the output value from the AND circuit 20 (logical value 1 (true value)), the counting decision unit 10a of the moving obstacle deciding section 10 adds one to the number of times of exceeding the threshold.

After that, the moving obstacle deciding apparatus of the embodiment 3 executes the search for the moving obstacle 5a and the foregoing decision processing continuously. If the counting value of the divisional area 3 by the counting decision unit 10a exceeds the reference counting value N, the moving obstacle deciding section 10 makes a decision that the obstacle detected in the divisional area 3 by the search signal transmitting and receiving section 1 is the moving obstacle 5a.

FIG. 17 is a diagram showing threshold decision results of the embodiment 3: FIG. 17(a) shows the results of the foregoing (2); and FIG. 17(b) shows the results of the foregoing (3). In FIG. 17, closed circles indicate that the threshold decision result is the moving obstacle 5a. As shown in FIG. 17(a), in the case of the foregoing (2), a decision of the moving obstacle 5a is made in the divisional area 1. In the search immediately after that, however, the condition changes to that of the foregoing (3) as shown in FIG. 17(b), and a decision of the moving obstacle 5a is made in the divisional area 3.

In other words, in the foregoing (3), it is detected that the moving obstacle 5a decided in the foregoing (2) goes away from the vehicle 2. In addition, from the divisional area where the moving obstacle 5a is decided, its positional information can also be grasped. Incidentally, when the moving obstacle 5a approaches the vehicle 2, the moving obstacle 5a is first detected in the divisional area 3, for example, and then in the divisional area 1 in a subsequent search.

As described above, according to the present embodiment 3, the decision reference value calculating section 6 divides the detection area, which is the range of the search signal transmitted from the search signal transmitting and receiving section 1, into a plurality of divisional areas in accordance with the distance from the search signal transmitting and receiving section 1 or in accordance with the time to the reception of the detection signal, and the moving obstacle deciding section 10 makes a decision as to whether the search target is the moving obstacle 5a or not from the result of comparing the difference value between the decision reference values obtained by the time-series searches for each of the divisional areas with the prescribed threshold. This makes it possible to decide as to whether the search target is the moving obstacle 5a or not correctly from the movement of the search target estimated from the continuity of the variations of the detection signals (reflected signals) obtained in time series in the same manner as the foregoing embodiment 1. In addition, when the moving obstacle 5a is detected, its positional information can be obtained correctly, as well.

In addition, according to the foregoing embodiment 3, the moving obstacle deciding section 10 makes a decision as to whether the search target is the moving obstacle 5a or not from the result of comparing the prescribed threshold set for each of the divisional areas 1-7 with the difference value between the decision reference values obtained by the time-series searches for each of the divisional areas 1-7. This makes it possible to improve the decision accuracy of the moving obstacle 5a in each of the divisional areas 1-7.

Furthermore, according to the foregoing embodiment 3, since the thresholds of the divisional areas are set in such a manner as to be reduced as they are apart from the search signal transmitting and receiving section 1, it can detect the moving obstacle 5a appearing in the distant place correctly.

Embodiment 4

The present embodiment 4 maps the detection area onto prescribed divisions, obtains the integral value of the detection signal for each divisional area, sets a specific or fixed threshold for each divisional area, and makes a decision of a moving obstacle when the number of times the difference value between the integral value of the current received signal and the average value of the integral values of the received signals up to the previous one goes out of the foregoing threshold range exceeds a certain value.

Figure 18:
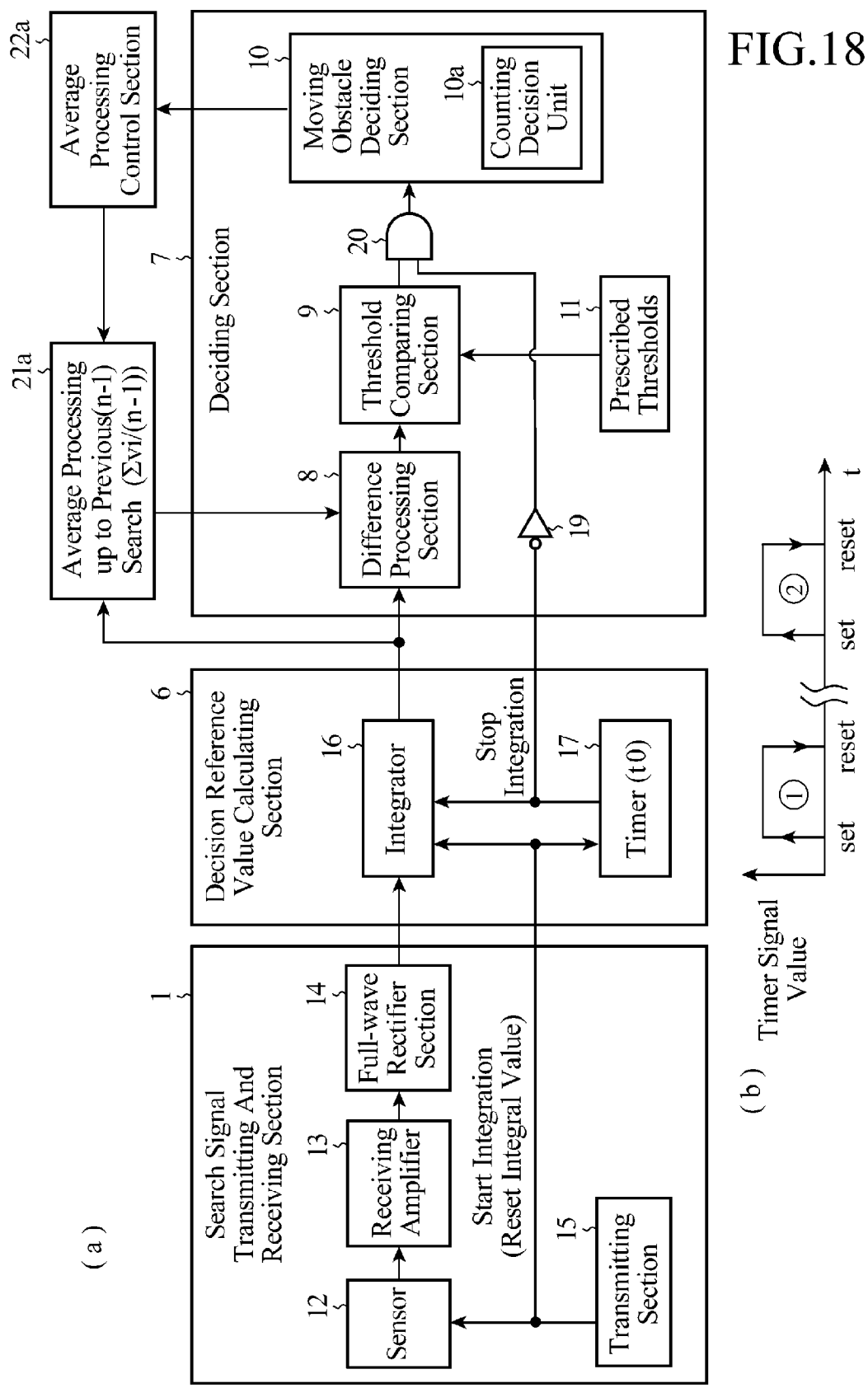
FIG. 18 is a block diagram showing a configuration of a moving obstacle deciding apparatus of an embodiment 4 in accordance with the present invention.

FIG. 18 is a block diagram showing a configuration of a moving obstacle deciding apparatus of the embodiment 4 in accordance with the present invention. In FIG. 18, the moving obstacle deciding apparatus of the present embodiment 4 includes, besides the components of the foregoing embodiment 3 shown in FIG. 13, an averaging processing section 21a and an averaging processing control section 22a.

The averaging processing section 21a obtains, as the decision reference values obtained by the time-series searches, the average values of the individual decision reference values (integral values of the received signals) which are obtained by the prescribed number of time-series searches up to the previous ((n−1)th) search for the individual divisional areas 1-7 by the integrator 16a. The averaging processing employs as the decision reference value the average value of the integral values of the received signals obtained by the prescribed number of searches up to the previous search, or the moving average value in the prescribed number of searches. According to the decision result by the moving obstacle deciding section 10, the averaging processing control section 22a carries out its control in such a manner as to fix the decision reference value to be output to the difference processing section 8 by halting the averaging processing by the averaging processing section 21a, or to calculate a new average value as the decision reference value by restarting the averaging processing.

In addition, in the present embodiment 4, the prescribed threshold range has been stored in the storage section 11a for each of the divisional areas 1-7, and the threshold comparing section 9 compares the prescribed threshold range with the difference value between the decision reference values. The moving obstacle deciding section 10 makes a decision that the obstacle which is being detected by the search signal transmitting and receiving section 1 is a moving obstacle if the number of times the difference value calculated by the difference processing section 8 exceeds the upper limit value of the threshold range or is less than the lower limit value exceeds a prescribed reference number of times. Incidentally, as for the other components, since they are the same as those shown in FIG. 13 of the foregoing embodiment 3, their description will be omitted here.

Next, the operation will be described.

FIG. 19 is a flowchart showing the operation of the moving obstacle deciding apparatus in FIG. 18, with reference to which the operation will be described in detail. Incidentally, the detection area of the search signal transmitting and receiving section 1 is assumed to be divided into the divisional areas 1-7 as shown in FIG. 12 described in the foregoing embodiment 3.

First, the sensor 12 of the search signal transmitting and receiving section 1 transmits the search signal at the transmission timing input from the transmitting section 15, and receives the reflected signals (ultrasonic echo signals) of the search signal from the obstacle. The signals received by the sensor 12 are amplified by the receiving amplifier 13 and then undergo full-wave rectification by the full-wave rectifier section 14.

The timer 17a starts counting the integration period t0 to be performed in a single search according to the transmission timing input from the transmitting section 15, and times the start and end of each of the divisional areas 1-7. The integrator 16a resets the previous integral value every time the start of integration of each of the divisional areas 1-7 is informed from the timer 17a, and integrates the received signals passing through the full-wave rectification by the full-wave rectifier section 14 during the period corresponding to each of the divisional areas 1-7 counted by the timer 17a (step ST 1).

On the other hand, using the integral values of the individual received signals obtained by the prescribed number of time-series searches up to the previous search for each of the divisional areas 1-7 input from the integrator 16a, the averaging processing section 21a calculates the average value ($\Sigma Vi/(n-1)$) of the integral values Vi of the received signals up to the previous one for each of the divisional areas 1-7, and stores as the decision reference value up to the previous one for each of the divisional areas 1-7.

The difference processing section 8 calculates, as the difference value between the decision reference values obtained by the time-series searches, the difference value between the current decision reference value input from the integrator 16a and the previous decision reference value input from the averaging processing section 21a for each of the divisional areas 1-7 (step ST 2). The threshold comparing section 9 compares the threshold specific for each of the divisional areas 1-7 read out of the storage section 11a with the difference value of each of the divisional areas 1-7 input from the difference processing section 8, and makes a decision for each of the divisional areas 1-7 as to whether the difference value exceeds the upper limit value of the foregoing threshold range or becomes less than the lower limit value (step ST 3). Incidentally, as to a person approaching the vehicle, a case can sometimes occur in which the received signal intensity is reduced because of clothes and the like. Accordingly, the lower limit value of the threshold range is provided considering a case where the received intensity of the reflected signal reduces even when the moving obstacle 5a approaches the vehicle.

When there is no variations indicating the movement of the obstacle in the reflected signals (received signals), a decision is made that it is not the moving obstacle 5a. Incidentally, as to a person approaching the vehicle, a case can sometimes occur in which the received signal intensity is reduced because clothes with low reflectance become reflecting areas. Accordingly, the lower limit value of the threshold range is provided considering the case where the received intensity of the reflected signals reduces even if the moving obstacle 5a approaches the vehicle 2.

In the threshold decision for each of the divisional areas 1-7 at step ST3, if the difference value of the difference processing section 8 is within the threshold range, the threshold comparing section 9 outputs a signal with logical value 0 (false value) to the AND circuit 20 as the threshold decision result signal for each of the divisional areas 1-7. In contrast, if the difference value of the difference processing section 8 exceeds the upper limit value of the threshold range of the corresponding one of the divisional areas 1-7 or is less than the lower limit value thereof, the threshold comparing section 9 outputs the logical value 1 (true value) to the AND circuit 20 as the threshold decision result signal for each of the divisional areas 1-7.

If the input signal from the threshold comparing section 9 is logical value 0 (false value), the AND circuit 20 outputs the signal with logical value 0 (false value) to the moving obstacle deciding section 10. If the output value of the AND circuit 20 is logical value 0 (false value), the counting decision unit 10a of the moving obstacle deciding section 10 does not increment the counting value of the corresponding divisional area. In addition, the moving obstacle deciding section 10 notifies the averaging processing control section 22a that the counting decision unit 10a does not increment the counting value.

If the input signals from the threshold comparing section 9 and NOT circuit 19 are logical value 1 (true value), the AND circuit 20 outputs the signal with logical value 1 (true value) to the moving obstacle deciding section 10. Receiving the output value with logical value 1 (true value) from the AND circuit 20, the counting decision unit 10a of the moving obstacle deciding section 10 adds one to the counting value of the corresponding divisional area. In this case, the moving obstacle deciding section 10 also notifies the averaging processing control section 22a that the counting decision unit 10a increments the counting value of the corresponding divisional area.

Receiving the notification that the difference value of the difference processing section 8 goes out of the threshold range and the counting value is incremented, the averaging processing control section 22a controls the averaging processing section 21a so as to halt the averaging processing of the divisional area corresponding to the counting value. Thus, the decision reference value, which is to be subjected to the difference processing between it and the next and subsequent decision reference values in the divisional area, is fixed to the average value of the integral values of the received signals up to the previous one. The reason for fixing the decision reference value to the average value of the integral values of the received signals up to the previous one is to exclude the integral value of the received signals that detect the moving obstacle 5a from the next and subsequent decision reference values.

On the other hand, the moving obstacle deciding section 10 makes a decision as to whether the difference value of the difference processing section 8 goes out of the threshold range of the divisional area in N consecutive searches (reference counting value N) in the threshold decision of each of the divisional areas 1-7 (step ST 4). If the difference value of the difference processing section 8 enters the threshold range of the corresponding divisional area here, the moving obstacle deciding section 10 notifies the averaging processing control section 22a of that.

Receiving the foregoing notification from the moving obstacle deciding section 10, the averaging processing control section 22a controls the averaging processing section 21a to restart the averaging processing of the divisional area corresponding to the counting value (step ST 5). Thus, the average value including the integral value of the current received signals in the divisional area is calculated as the decision reference value to be subjected to the difference processing between it and the next and subsequent decision reference values.

Incidentally, in the foregoing explanation, although a case is described where the averaging processing section 21a restarts the averaging processing if the absolute value of the difference value between the decision reference value up to the previous one and the current decision reference value falls within the threshold range even once, a configuration is also possible where the averaging processing section 21a restarts the averaging processing when the number of times of falling within the threshold range becomes a prescribed number of times (twice or more).

If the difference value of the difference processing section 8 goes out of the threshold range of the corresponding divisional area in N consecutive searches (reference counting value N), and hence the counting value of the counting decision unit 10a exceeds the reference counting value N, the moving obstacle deciding section 10 makes a decision that the obstacle detected in the divisional area is the moving obstacle 5a.

If the obstacle detected as the moving obstacle 5a is a person or the like approaching the vehicle 2, the intensity or receiving timing of the received signals from the moving obstacle 5a varies in the following searches as it approaches the vehicle 2. For this reason, when detecting the moving obstacle 5a, the moving obstacle deciding section 10 monitors the variations in the received signals due to the moving obstacle 5a in the following searches, and decides the changes in the divisional areas as to which the counting value exceeds the reference counting value N, that is, the movement of the detected moving obstacle 5a (step ST 6).

If the variations in the received signals due to the moving obstacle 5a occur in the following searches, the moving obstacle deciding section 10 makes a decision as to whether the foregoing variations are detected periodically and repeatedly in the divisional area (step ST 7). Unless the foregoing variations are detected periodically and repeatedly, the moving obstacle deciding section 10 makes a final decision that the detected obstacle is the moving obstacle 5a (step ST 8).

Incidentally, as to whether the detection is made periodically or not is decided by obtaining the behavior of the received signals due to the periodic variations of the reflecting area of the search signal on the static obstacle 5b by experiment in advance, for example, and by making a decision as to whether the received signals vary in accordance with that period. Giving redundancy to the decision conditions of the moving obstacle 5a in this way can prevent the static obstacle 5b, which exhibits the periodic movement such as branches and leaves of a tree swayed in the wind, from being decided as the moving obstacle 5a.

In addition, the moving obstacle deciding section 10 makes a final decision that the detected obstacle is not the moving obstacle 5a if it decides that the foregoing variations are not found in the received signals due to the moving obstacle 5a or if the foregoing variations are repeated periodically (step ST 9). This makes it possible to prevent the static obstacle 5b exhibiting the periodic movement such as branches and leaves of a tree swayed in the wind from being erroneously decided as the moving obstacle 5a.

As described above, according to the present embodiment 4, the decision reference value calculating section 6 divides the detection area, which is the range of the search signal transmitted from the search signal transmitting and receiving section 1, into a plurality of divisional areas in accordance with the distance from the search signal transmitting and receiving section 1 or in accordance with the time to the reception of the detection signal, and the moving obstacle deciding section 10 makes a decision as to whether the search target is the moving obstacle 5a or not from the result of comparing the difference value between the decision reference values obtained by the time-series searches for each divisional area with the prescribed threshold. In addition, the present embodiment 4 includes the averaging processing section 21a for calculating the average value or moving average value of the integral values of the detection signals obtained by the prescribed number of time-series searches up to the previous search for each divisional area, and the decision reference value calculating section 6 obtains the difference value between the average value or moving average value calculated by the averaging processing section 21a and the integral value of the detection signals obtained by the current search, and makes a decision as to whether the search target is the moving obstacle or not from the compared result of the difference value with the prescribed threshold. According to such a configuration, it can decide in the same manner as the foregoing embodiment 1 as to whether the search target is the moving obstacle 5a or not correctly for each divisional area from the movement of the search target estimated from the continuity of the variations of the detection signals (reflected signals) obtained in time series. In addition, by taking the average value or moving average value of the integral values of the detection signals obtained by the prescribed number of searches up to the previous search, since the noise is averaged even if unexpected noise is received as the detection signals, the present embodiment 4 can decide the moving obstacle 5a correctly decision.

In addition, according to the foregoing embodiment 4, since the moving obstacle deciding section 10 does not decide that the search target is the moving obstacle 5a when the movement of the search target obtained from the detection signals repeats the periodic variations, it can prevent the static obstacle 5b exhibiting the periodic movement such as branches and leaves of a tree swayed in the wind from being erroneously decided as the moving obstacle 5a.

Incidentally, the same processing as that of step ST7 shown in FIG. 19 can also be applied to the foregoing embodiments 1-3. For example, if the moving obstacle 5a is detected in the foregoing embodiments 1-3, the moving obstacle deciding section 10 monitors as to whether the received signals from the moving obstacle 5a have variations or not, and makes a decision as to whether the variations are detected periodically and repeatedly. Thus, it makes a final decision that it is not the moving obstacle 5a if the variations are not found in the received signals from the moving obstacle 5a or the variations are repeated periodically. In this way, in the foregoing embodiments 1-3, giving the redundancy to the decision conditions of the moving obstacle 5a can reduce erroneous decision of the moving obstacle 5a.

INDUSTRIAL APPLICABILITY

As described above, the present invention is used for mobile units such as motor vehicles, and is widely applicable to the obstacle deciding apparatus for appropriately identifying a moving obstacle.

What is claimed is:

1. A moving obstacle deciding apparatus comprising:
a search signal transmitting and receiving section for transmitting a search signal, and for receiving the search signal reflected from a search target as a detection signal;
a decision reference value calculating section for dividing a range of a transmission period of the search signal into a prescribed number of divisions, for calculating a decision reference value based on an integral value of the detection signal occurring in each of the divisions, and for dividing a detection area, which is a range of the search signal transmitted from the search signal transmitting and receiving section, into a plurality of divisional areas in accordance with distance from the search signal transmitting and receiving section or in accordance with time up to reception of the detection signal; and
a deciding section for making a decision as to whether the search target is a moving obstacle or not in accordance with a compared result of a difference value between the decision reference values obtained in time-series searches by the decision reference value calculating section with a prescribed threshold for each of the divisional areas,
wherein the thresholds of the divisional areas are set in a manner as to become smaller as separated farther away from the search signal transmitting and receiving section.

2. The moving obstacle deciding apparatus according to claim 1, further comprising:
a counting decision unit for counting a number of times the difference value exceeds the prescribed threshold, wherein
the deciding section makes a decision that the search target is a moving obstacle if the counting value of the counting decision unit exceeds a prescribed number of times.

3. The moving obstacle deciding apparatus according to claim 1, wherein
the deciding section makes a decision as to whether the search target is a moving obstacle or not in accordance with a compared result of a prescribed threshold set for each of the divisional areas with the difference value between the decision reference values obtained in the time-series searches for each of the divisional areas.

4. The moving obstacle deciding apparatus according to claim 1, wherein
the deciding section makes a decision that the search target is not a moving obstacle if movement of the search target obtained from the detection signal repeats periodic variations.

5. The moving obstacle deciding apparatus according to claim 1, wherein
the prescribed threshold has two values of an upper limit and a lower limit; and
the deciding section makes a decision that the search target is a moving obstacle by considering that the difference value exceeds the prescribed threshold when the difference value exceeds the upper limit value of the prescribed threshold or becomes less than the lower limit value.

6. A moving obstacle deciding apparatus comprising:
a search signal transmitting and receiving section for transmitting a search signal, and for receiving the search signal reflected from a search target as a detection signal;
a decision reference value calculating section for dividing a range of a transmission period of the search signal into a prescribed number of divisions, and for calculating a decision reference value based on an integral value of the detection signal occurring in each of the divisions;
a deciding section for making a decision as to whether the search target is a moving obstacle or not in accordance with a compared result of a difference value between the decision reference values obtained in time-series searches by the decision reference value calculating section with a prescribed threshold; and
an averaging processing section for calculating an average value or moving average value of the integral values of the detection signals obtained in a prescribed number of time-series searches up to a previous search, wherein
the decision reference value calculating section obtains a difference value between the average value or moving average value calculated by the averaging processing section and the integral value of the detection signal obtained by a current search, and makes a decision as to whether the search target is a moving obstacle in accordance with a compared result between the difference value and the prescribed threshold.

7. The moving obstacle deciding apparatus according to claim 6, wherein
the averaging processing section stops the averaging processing if the difference value between the average value or moving average value of the integral values of the detection signals obtained in the prescribed number of time-series searches up to the previous search and the integral value of the detection signal calculated in the current search exceeds a prescribed threshold; and
the deciding section fixes a target, which will be subjected to calculation of taking differences between the target and integral values of detection signals obtained in next and subsequent searches, to the average value or moving average value of the integral values of the detection signals obtained in the prescribed number of time-series searches up to the previous search until the averaging processing section restarts the averaging processing.

8. The moving obstacle deciding apparatus according to claim 7, wherein
the averaging processing section restarts the averaging processing if the number of times the difference value between the average value or moving average value of the integral values of the detection signals obtained in the prescribed number of time-series searches up to the previous search and the integral value of the detection signal calculated in the current search does not exceed the prescribed threshold continues a prescribed number of times.

9. A moving obstacle deciding method comprising:
transmitting, by utilizing a search signal transmitting and receiving section, a search signal, and receiving, by utilizing the search signal transmitting and receiving section, the search signal reflected from a search target as a detection signal;
a decision reference value calculating step for dividing a range of a transmission period of the search signal into a prescribed number of divisions, for calculating a decision reference value based on an integral value of the detection signal occurring in each of the divisions, and for dividing a detection area, which is a range of the search signal transmitted from the search signal transmitting and receiving section, into a plurality of divisional areas in accordance with distance from the search signal transmitting and receiving section or in accordance with time up to reception of the detection signal; and
making a decision as to whether the search target is a moving obstacle or not in accordance with a compared result of a difference value between the decision reference values obtained in time-series searches by the decision reference value calculating step with a prescribed threshold for each of the divisional areas,
wherein the thresholds of the divisional areas are set in a manner as to become smaller as separated farther away from the search signal transmitting and receiving section.

10. The moving obstacle deciding method according to claim 9, further comprising:
counting a number of times the difference value exceeds the prescribed threshold; and
deciding that the search target is a moving obstacle if the counting value of the counting decision unit exceeds a prescribed number of times.

11. The moving obstacle deciding method according to claim 9, further comprising:
making a decision as to whether the search target is a moving obstacle or not in accordance with a compared result of a prescribed threshold set for each of the divisional areas with the difference value between the decision reference values obtained in the time-series searches for each of the divisional areas.

12. The moving obstacle deciding method according to claim 9, further comprising:
deciding that the search target is not a moving obstacle if movement of the search target obtained from the detection signal repeats periodic variations.

13. The moving obstacle deciding method according to claim 9, wherein the prescribed threshold has two values of an upper limit and a lower limit, the method further comprising:
deciding that the search target is a moving obstacle by considering that the difference value exceeds the prescribed threshold when the difference value exceeds the upper limit value of the prescribed threshold or becomes less than the lower limit value.

14. A moving obstacle deciding method comprising:
transmitting, by utilizing a search signal transmitting and receiving section, a search signal, and receiving, by utilizing the search signal transmitting and receiving section, the search signal reflected from a search target as a detection signal;
a decision reference value calculating step for dividing a range of a transmission period of the search signal into a prescribed number of divisions, and for calculating a decision reference value based on an integral value of the detection signal occurring in each of the divisions;
a deciding step for making a decision as to whether the search target is a moving obstacle or not in accordance with a compared result of a difference value between the decision reference values obtained in time-series searches by the decision reference value calculating step with a prescribed threshold; and
calculating an average value or moving average value of the integral values of the detection signals obtained in a prescribed number of time-series searches up to a previous search, wherein
the decision reference value calculating step obtains a difference value between the average value or the calculated moving average value and the integral value of the detection signal obtained by a current search, and makes a decision as to whether the search target is a moving obstacle in accordance with a compared result between the difference value and the prescribed threshold.

15. The moving obstacle deciding method according to claim 14, wherein
stopping the averaging processing if the difference value between the average value or moving average value of the integral values of the detection signals obtained in the prescribed number of time-series searches up to the previous search and the integral value of the detection signal calculated in the current search exceeds a prescribed threshold; and
the deciding step fixes a target, which will be subjected to calculation of taking differences between the target and integral values of detection signals obtained in next and subsequent searches, to the average value or moving average value of the integral values of the detection signals obtained in the prescribed number of time-series searches up to the previous search until restarting the averaging processing.

16. The moving obstacle deciding method according to claim 15, further comprising:
restarting the averaging processing if the number of times the difference value between the average value or moving average value of the integral values of the detection signals obtained in the prescribed number of time-series searches up to the previous search and the integral value of the detection signal calculated in the current search does not exceed the prescribed threshold continues a prescribed number of times.

* * * * *